US006801930B1

(12) United States Patent
Dionne et al.

(10) Patent No.: US 6,801,930 B1
(45) Date of Patent: Oct. 5, 2004

(54) METHOD AND APPARATUS FOR MAINTAINING INFORMATION ABOUT USERS SHARING THE CELLS PARTITIONING A COMPUTER-GENERATED ENVIRONMENT

(75) Inventors: Carl Dionne, Montreal (CA); Martin Lavoie, Montreal (CA)

(73) Assignee: Quazal Technologies Inc., Montreal (CA)

( * ) Notice: Subject to any disclaimer, the term of this patent is extended or adjusted under 35 U.S.C. 154(b) by 806 days.

(21) Appl. No.: 09/662,470

(22) Filed: Sep. 15, 2000

(30) Foreign Application Priority Data

Feb. 26, 2000 (GB) .............................. 0004479

(51) Int. Cl.$^7$ .............................. G06F 15/16

(52) U.S. Cl. .......................... 709/205; 709/204; 463/7; 463/32; 463/42

(58) Field of Search ............................... 709/204, 205; 345/757; 463/7, 32, 42

(56) References Cited

U.S. PATENT DOCUMENTS

| 5,772,512 | A | | 6/1998 | Chichester |
| 5,832,229 | A | * | 11/1998 | Tomoda et al. ............. 709/227 |
| 5,838,909 | A | | 11/1998 | Roy et al. |
| 5,879,236 | A | | 3/1999 | Lambright |
| 6,126,548 | A | * | 10/2000 | Jacobs et al. ................ 463/42 |
| 6,219,045 | B1 | * | 4/2001 | Leahy et al. ............... 345/757 |
| 6,267,674 | B1 | * | 7/2001 | Kondo et al. ............... 463/32 |
| 6,347,994 | B1 | * | 2/2002 | Yoshikawa et al. ........... 463/7 |
| 6,438,581 | B1 | * | 8/2002 | Neuhauser et al. ......... 709/205 |

FOREIGN PATENT DOCUMENTS

| GB | 2330739 A | 4/1999 |
| JP | 11328124 A | 11/1999 |
| WO | WO 97/23845 | 7/1997 |

OTHER PUBLICATIONS

Craymer et al, "A Scalable, RTI–Compatible Interest Manager for Parallel Processors" In Proceedings of the 1997 Spring Simulation Interoperability Workshop, 1997, 97S–SIW–154.

van Hook et al, "Approaches to Relevance Filtering", In Eleventh Workshop on Standards for the Interoperability of Distributed Simulations, 1994.

van Hook et al, "Approaches to TRI Implementation of HLA Data Distribution Management Services", In Proceedings of the $15^{TH}$ Workshop on Standards for the Interoperability of Distributed Simulations, 1996.

(List continued on next page.)

*Primary Examiner*—Wen-Tai Lin
(74) *Attorney, Agent, or Firm*—Nixon & Vanderhye P.C.

(57) ABSTRACT

A computer network is configured to define and update a shared computer-generated environment. A serving computer divides a computer-generated environment into a plurality of cells. A plurality of user computer terminals have display devices, storage, processing capability and a connection to the network. A first user computer terminal defines an entry in the computer-generated environment in one or in a plurality of adjoining cells. The network connection receives notification data about other users sharing cells occupied by the first user. A list of users are stored that share or have shared cells occupied by the first user. The processing capability generates a message for another user identified in the list and generates a local representation of the environment in response to data received from other users and in response to user movements. In this way, it is possible for a very large number of users to share a common computer-generated environment using available networking and processing capabilities.

24 Claims, 23 Drawing Sheets

OTHER PUBLICATIONS

Petty et al, "Experimental Comparison of d–Rectangle Intersection Algorithms Applied to HLA Data Distribution", In Proceedings of the 1997 Fall Simulation Interoperability Workshop, 1997, 97F–SIW–016.

Singhal, Effective Remote Modeling in Large–Scale Distributed Simulation and Visualization Environments, PhD Thesis, Stanford University, 1996.

Singhal et al, "Using a Position History–Based Protocol for Distributed Object Visualization", In Designing Real–Time Graphics for Entertainment [Course Notes for SIGGRAPH '94 Course No. 14], Jul. 1994.

Singhal et al, "Networked Virtual Environments—Design and Implementation", ACM Press Books, SIGGRAPH Series, Jul. 1999.

* cited by examiner

| PLAYER 102 | ID | | 801 |
|---|---|---|---|
| IP ADDRESS | 1.1239 103 | | 802 |
| POSITION | 100573,1043 | | 803 |
| AVATAR | [POINTER] | | 804 |
| VALIDITY | [NEARBY] | | 805 |

| PLAYER 103 | ID |
|---|---|
| IP ADDRESS | 1.151325 |
| POSITION | 100548,1055 |
| AVATAR | [POINTER] |
| VALIDITY | [NEARBY] |

| PLAYER 105 | ID | |
|---|---|---|
| IP ADDRESS | 2. 53 1 54 | |
| POSITION | 100540,500 | |
| AVATAR | [POINTER] | |
| VALIDITY | [NEARBY] | 806 |

*Figure 8*

| AVATAR 102  IID | | 901 |
| --- | --- | --- |
| LIFE | IP ADDRESS | 902 |
| POSITION | 100573,1043 | 903 |
| TRAJECTORY | ......... , ......... | 904 |
| FIRST DERIVATIVES OF TRAJECTORY | ......... , ......... | 905 |
| LOOK | [POINTER] | 906 |
| GUNS | [POINTER] | 907 |

*Figure 9*

| MISSILE ID | | 1001 |
| --- | --- | --- |
| POSITION | 100325, 1006 | 1002 |
| TRAJECTORY | 500 , 61 | 1003 |
| LOOK | [POINTER] | 1004 |

*Figure 10*

US 6,801,930 B1

METHOD AND APPARATUS FOR MAINTAINING INFORMATION ABOUT USERS SHARING THE CELLS PARTITIONING A COMPUTER-GENERATED ENVIRONMENT

BACKGROUND OF THE INVENTION

1. Field of the Invention

The present invention relates to a computer network configured to define and update a shared computer-generated environment.

2. Description of the Related Art

Computer based multi-player networked games are known and the emergence of the Internet as a popular medium for recreation has resulted in many games-oriented services being provided. In a typical situation, a user visits a site that provides access to a game. It is possible then for the user to choose from several different instantiations of the game, each of which has several players interacting over the Internet. This approach minimises difficulties of implementing multi-user network games, in that the total number of players in each instantiation of the game is kept to a minimum, such as eight.

In a computer game, moving objects have the potential to interact with most other objects in the computer-generated game environment. This requires a large number of comparisons to be performed between objects. All these comparisons must be performed to generate a single update of the game, and several updates of the game must be performed each second, in order to create a convincing illusion of smooth interaction and motion. When sufficiently large numbers of moving objects are present, the number of comparisons quickly becomes overwhelming, and this places a limit on the number of interacting moving objects in any computer-generated environment. There is a trade-off between the number of objects and the speed with which the environment may be updated, due to the need for communication between objects. In a gaming environment, speed is of great importance.

Multi-player games, and other types of shared multi-user simulations, thus suffer from a highly restricted maximum number of users. The Internet itself, and current server technology, has the capability to communicate between thousands and perhaps hundreds of thousands of individual computer users at the same time. The present state of the art in multi-user games, however, is unable to take advantage of this possibility. This restriction applies generally to computer-generated environments where multiple interacting users communicate over a network.

BRIEF SUMMARY OF THE INVENTION

According to a first aspect of the present invention, there is provided a computer network configured to define and update a shared computer-generated environment, comprising a serving computer configured to divide a computer-generated environment into a plurality of cells; and a plurality of user-generated terminals having display means, storage means, processing means and network connection means, wherein a first user-computer-terminal defines an entry in said computer-generated environment in one cell or in a plurality of adjoining cells; said network connection receives notification data about other users sharing cells occupied by said first user; said storage means stores a list of users that share or have shared cells occupied by said first user; and said processing means generates a message for another user identified in said list and generates a local representation of said environment in response to data received from other users and in response to other user movements.

In a preferred embodiment, the processing means is configured to predict movements by position history based dead reckoning and a message may be generated in response to an unpredicted user movement.

According to a second aspect of the present invention, there is provided a method of updating a computer-generated environment shared between users connected via computer terminals connected to a network, said computer-generated environment being divided into cells, wherein a user's computer terminal performs the steps of receiving notification of other users sharing the same cell or cells; updating a list of users that share or have shared the same cell; generating a message for at least one user in said list; updating an environment generated on the computer terminal in response to other user data; and updating said list in response to user movements.

BRIEF DESCRIPTION OF THE SEVERAL VIEWS OF THE DRAWINGS

FIG. 8 details the list of nearby players shown in FIG. 7;

FIG. 9 details an avatar data item of the type shown in FIG. 7;

FIG. 10 details an object for animation of the type shown in FIG. 7;

BEST MODE FOR CARRYING OUT THE INVENTION

Figure 1:
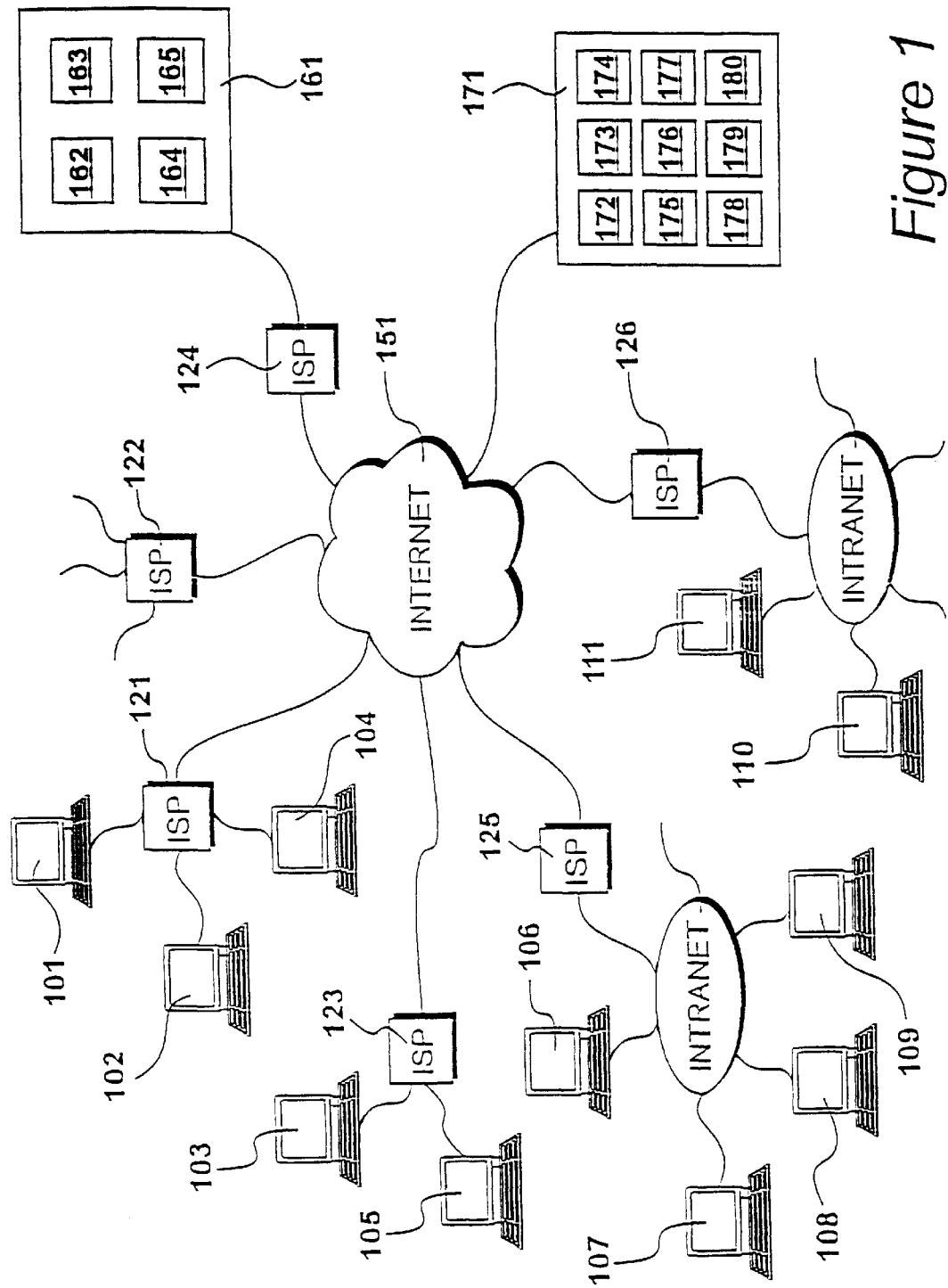
FIG. 1 illustrates a network environment, including user terminals and game servers supporting play between users at said terminals.

Simulated environments in which multiple users contribute and receive data to and from the simulated environment are implemented using a network of connected computers. An environment for connecting multiple users to a shared simulated environment is illustrated in FIG. 1. Computer terminals 101 to 111 are connected via Internet Service Providers (ISPs) 121 to 126 to the Internet 151. The ISPs 121 to 126, in combination with user terminals 101 to 111, provide each individual user with a unique IP address, e-mail account and other optional Internet facilities such as are commonly provided to a user with an ISP account.

A first game server 161 provides facilities to enable a simulation, or game, to be shared among multiple users connected via the Internet 151. A game server generates the virtual environment in which users interact with each other.

The game server 161 includes four high capacity computers 162, 163, 164 and 165, that combine to create a shared game environment. The server 161, regardless of its processing capabilities, is restricted in its ability to sustain a shared environment for more than a tiny fraction of the potential users on the Internet. A larger server 171 contains nine networked high capacity computers 172 to 180, of the same type. However, the number of simultaneous interacting users this server can sustain is still prohibitively restricted.

Figure 2:
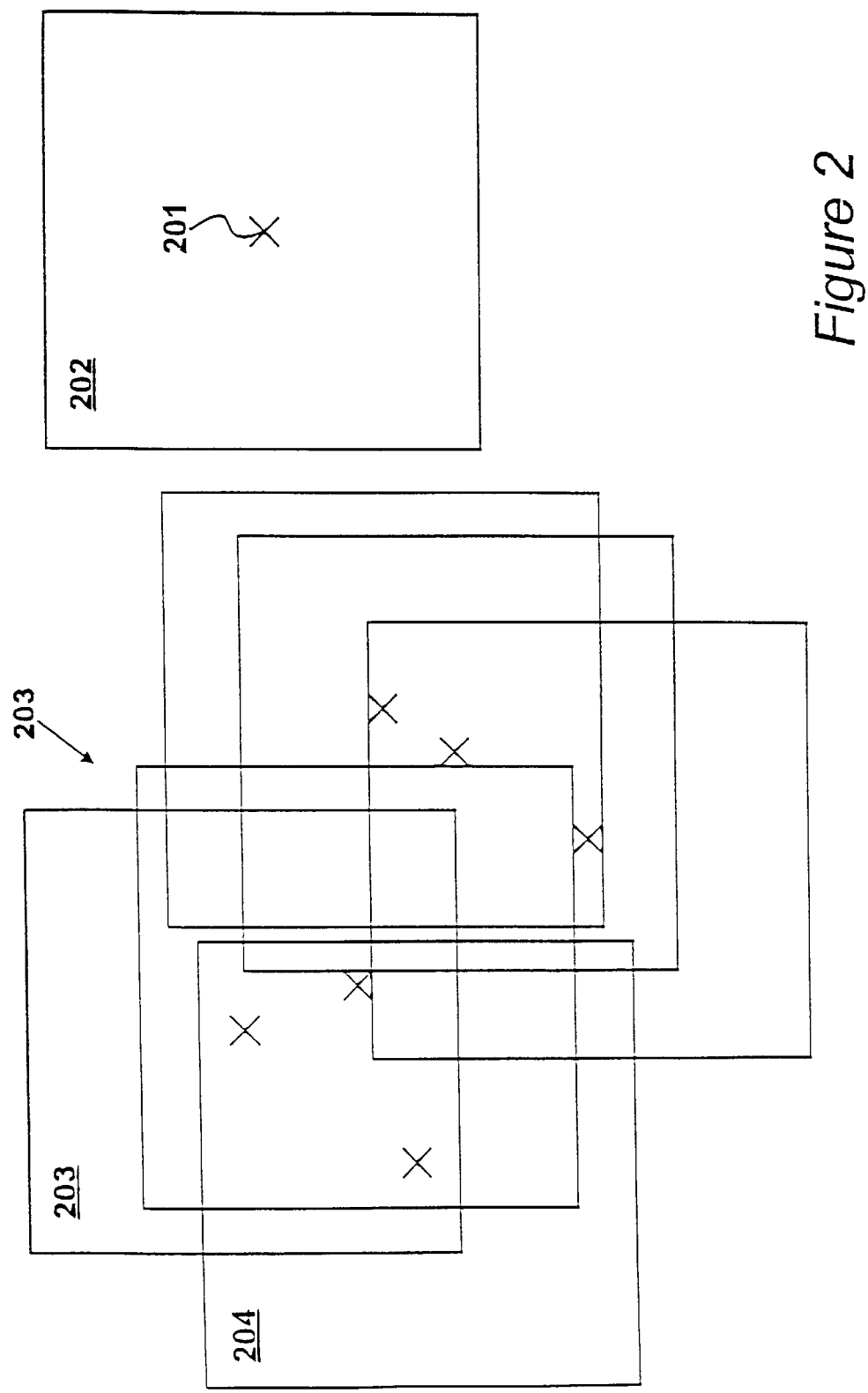
FIG. 2 details a known method for implementing interaction between players at the computer terminals shown in FIG. 1, as would be performed by a game server.

A number, n, of users connected to a shared environment requires processing power proportional to n squared. This is illustrated in FIG. 2. Each player has a location 201, marked by a cross, and an active region 202, marked by a square around it. Player 201 is isolated from other players 203, and so it is known that nothing player 201 can do will interfere with the other players 203, and nothing that the other players 203 can do will interfere with player 201.

Knowing which players interact is necessary for reducing the amount of processing performed as the game is updated. The square active regions provide a simple geometric method for defining whether or not players are able to interact with each other. Determining which players have overlapping active regions may require substantial processing power. If only two players are in the game, their respective active regions 203 and 204 may be compared to see if they overlap. The processing steps required for this are few. When four players are present, then sixteen such comparisons need to be made, and so on. When a hundred players are present, the processing requirement becomes non-trivial. For players numbering several thousand, the processing requirement, merely to identify overlapping active regions, becomes impractical; the comparison of n overlapping areas requires processing steps in proportion to n squared. Optimisation methods are known for reducing the order of this problem. However, it is known that such optimisations do not provide solutions for shared game environments having more than a few hundred players, and usually the number practically sustainable is far lower than this.

In the art, this difficulty is overcome by restricting the number of users sharing the same game environment. In order to meet demand when a game becomes popular, the same environment may be instantiated multiple times, upon as many servers as necessary. However, each instantiation has a different set of players. Each such duplicated environment is isolated.

Figure 3:
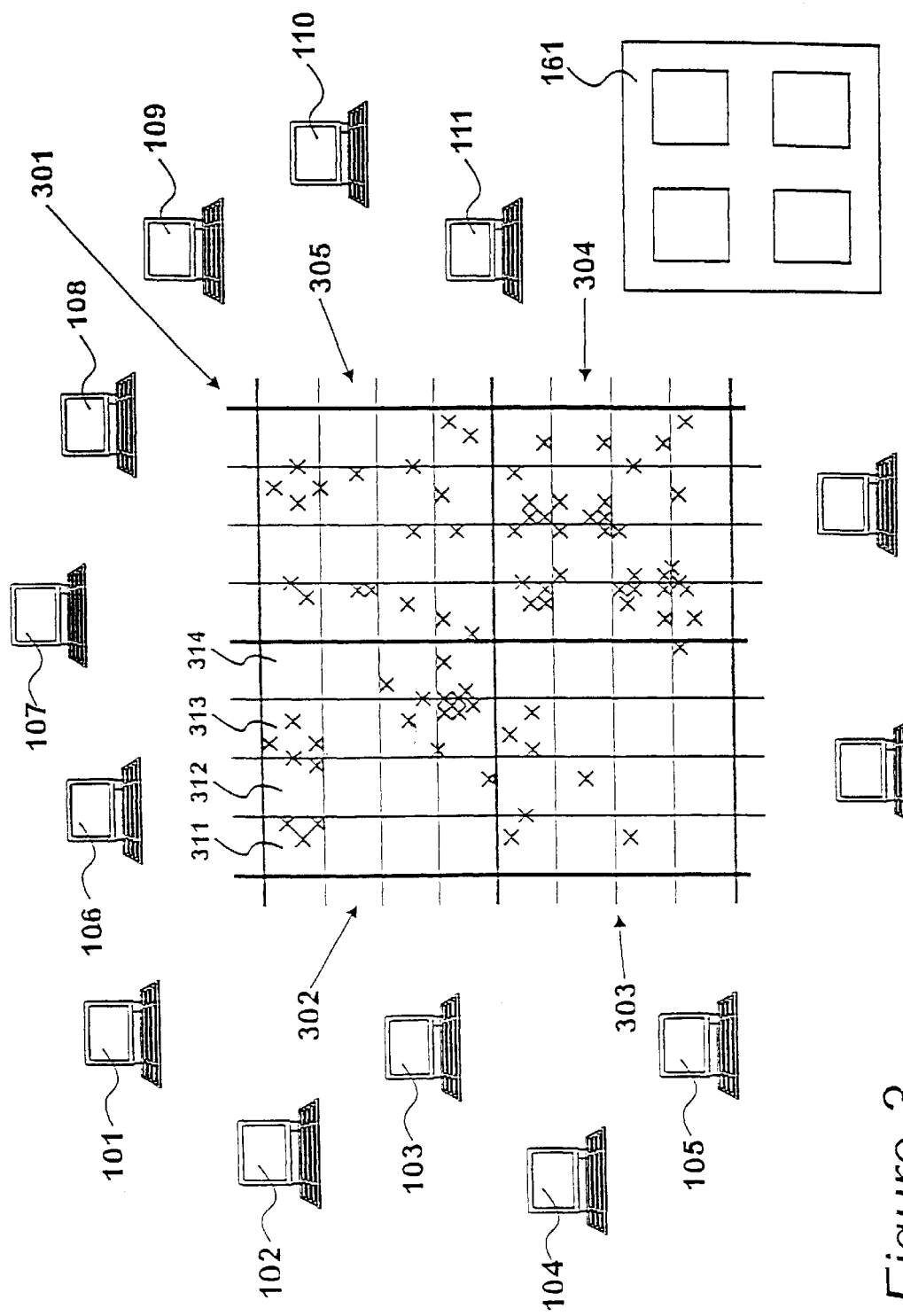
FIG. 3 shows an improved method for implementing interaction between players, and the game server, shown in FIG. 1.

A plan or map of a shared multi-user virtual environment operating in accordance with the present invention, is illustrated in FIG. 3. A grid of squares 301 represents the area in which the game is to be played. Each computer 162 to 165 of the game server 161 is considered as a processing node. Each node 162 to 165 has responsibility for one of four main regions 302 to 305 of the game. Individual users are represented by crosses within the game 301. Each of the main regions 302 to 305 is further subdivided into smaller regions, known as cells, such as those illustrated at 311, 312, 313 and 314. The three crosses shown in cell 311 correspond to the three players at terminals 101, 102, and 103.

A plan of the type shown in FIG. 3 is provided to users in order to aid navigation and to see where other players are located. However, most games are played through the medium of a three-dimensional projection of the virtual world, represented in FIG. 3 as a two-dimensional map. In the 3D world view, each other player can be viewed as a character having particular visual attributes. Players may choose these attributes before they enter the game. Thus, a player chooses a character to represent him or her within the simulated environment. This character is usually referred to as an "avatar", and enables a user to engage with other players whose playing abilities are known by their avatar's appearance. Typically, an avatar may start out with a number of lives, and this number is decremented each time an avatar is killed during action of the game.

Figure 4:
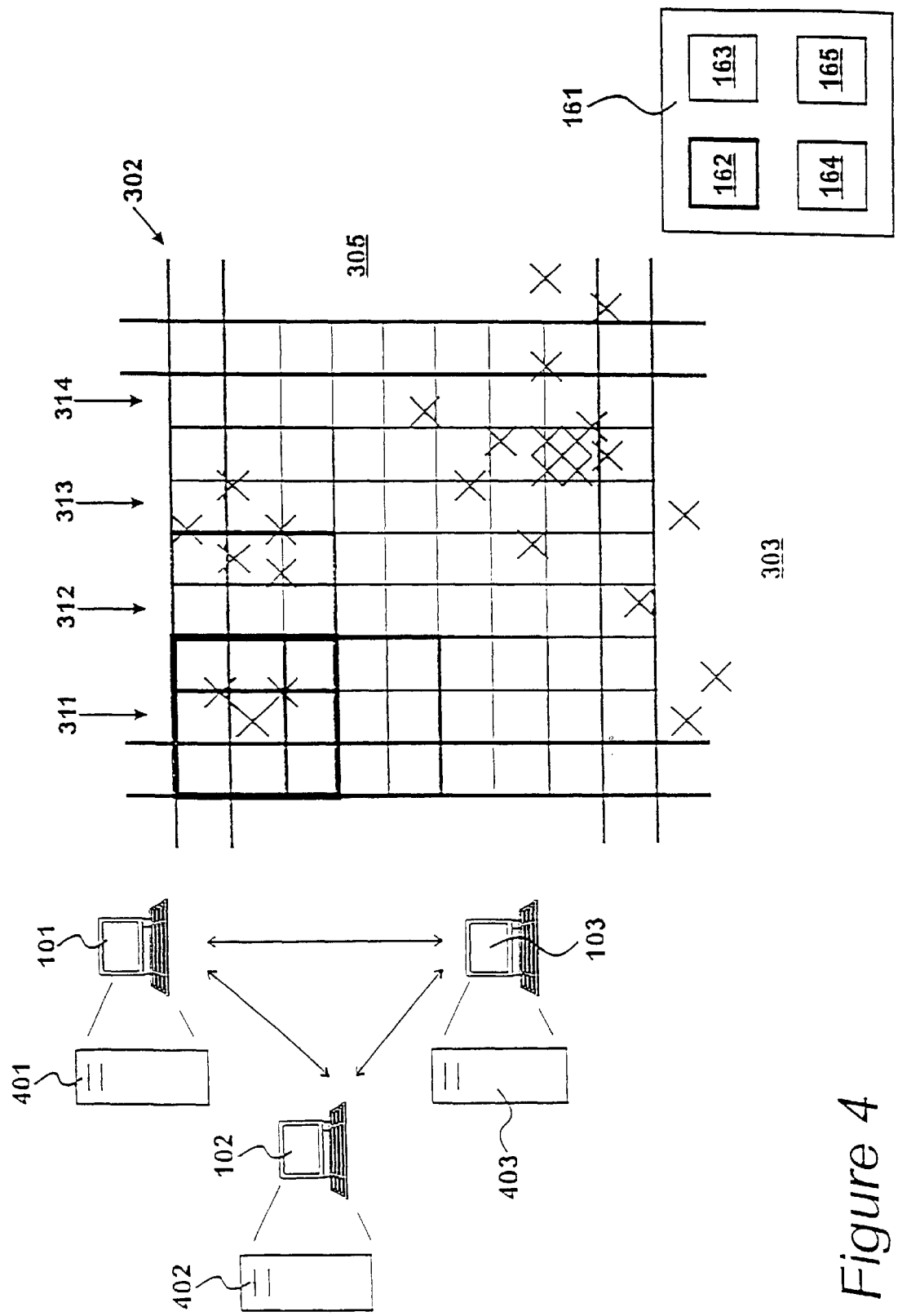
FIG. 4 details the improved method of implementation shown in FIG. 3, including a list of nearby players for each user terminal.

The cells that form the lowest area subdivision shown in FIG. 3 are implemented in an overlapping form, and this is shown in a detailed view of region 302 in FIG. 4. Cells 311 to 314 overlap each other and form the top row of region 302. The same overlapping scheme is followed in the other dimension, resulting in the illusion, in the illustration, of many much smaller overlapping squares. Furthermore, it should be clarified that although a four-by-four cell arrangement is shown in this illustration, in practice the number of cells per region is much larger than this, and the smaller number is shown for reasons of clarity only.

The three users at terminals 101 to 103 are represented by crosses in the upper left cell 311. Just as each cell overlaps, the larger regions 302 to 305 also overlap, by an amount corresponding to one third of a cell width and height. Thus, in the invention, the scheme shown in FIG. 2 is replaced by a fixed grid of cells. As a player moves around in the game, the active region is considered as the cell in which it is located, not a movable area centred upon the user. Due to the overlapping of cells, an individual player may be in up to four cells at once. Cells overlap to sufficient degree that players that are significantly close will always be in a shared cell. In place of the intensive mathematical comparison between players' moveable regions of influence, as illustrated in FIG. 2, each user terminal 101 to 103 maintains a list of nearby users 401 to 403. Each list 401 to 403 provides a list of other users in shared cells. A transfer protocol is implemented so that whenever a user enters a new cell, or leaves a previously occupied cells, the user's list is updated.

By consulting the list of nearby users 401, a computer terminal 101 may quickly update a local representation of the immediately surrounding game area. This can be done without reference to the thousands of other users that may share the game. In the example shown in FIG. 4, players 101 to 103 are excluded from the need to communicate with any other players. A three-way communication is set up between computer terminals 101 to 103. Play between users 101 to 103 can thereby be performed at a high speed, substantially adding to the realism of the game, while reducing the computational overhead at the server. Communication with the game server 161 may be in the form of transmissions only, with intervention occurring only when players cross cell boundaries.

The overlapping of cells also results in the overlapping of the main regions 302 to 305. This ensures that players near the borders of a region 302 are able to interact correctly with players in an adjacent region 303. It is possible for a player to be in up to four regions 302 to 305 at once. A transfer protocol is implemented that facilities transfer of responsibility for a player from one processing node 162 to another 163. Due to the cell overlap, a level of hysteresis is facilitated, such that repeated crossing of a cell or main region boundary does not result in repeated unnecessary communication.

The arrangement shown in FIG. 4 permits extension of the game area beyond regions 302 to 305. For example, the second game server 171 contains nine additional nodes 172 to 180, each of which may provide an additional region of the game. Additional regions may be added, depending on server availability.

By the provision of lists 401 to 403, the invention overcomes a limitation of known simulations, and thereby opens up such simulations to be shared by many thousands, and possibly even hundreds of thousands of simultaneous users.

Figure 5:
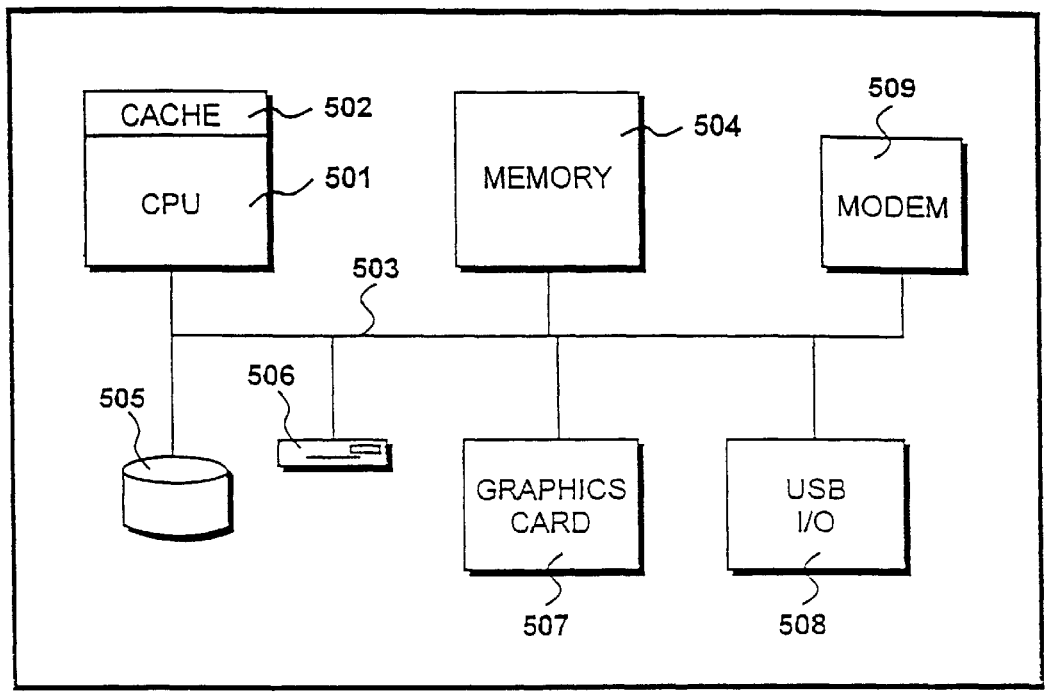
FIG. 5 details hardware components of a user terminal of the type illustrated in FIG. 3, including a memory.

Hardware forming the main part of a user's computer terminal 101 is illustrated in FIG. 5. A central processing unit 501 fetches and executes instructions and manipulates data. Frequently accessed instructions and data are stored in a high speed cache memory 502. The central processing unit 501 is connected to a system bus 503. This provides connectivity with a larger main memory 504, which requires significantly more time to access than the cache 502. The main memory 504 contains between thirty-two and one hundred and twenty-eight megabytes of dynamic random access memory.

A hard disc drive (HDD) 505 provides non-volatile bulk storage of instructions and data. A floppy disk drive 506 provides removable storage. A graphics card 507 receives graphics data from the CPU 501, along with graphics instructions. Preferably, the graphics card 507 includes substantial dedicated graphical processing capabilities, so that the CPU 501 is not burdened with computationally intensive tasks for which it is not optimised. A universal serial bus (USB) interface 508 provides connectivity to USB peripherals such as a mouse and keyboard, and possibly game-oriented peripherals such as a joystick, 3D mouse, or other device optimised for game playing. A modem 509 provides connectivity to the Internet via a telephone connection to the user's ISP 121. The equipment shown in FIG. 5 constitutes a personal computer of fairly standard type, such as a PC or Mac.

Figure 6:
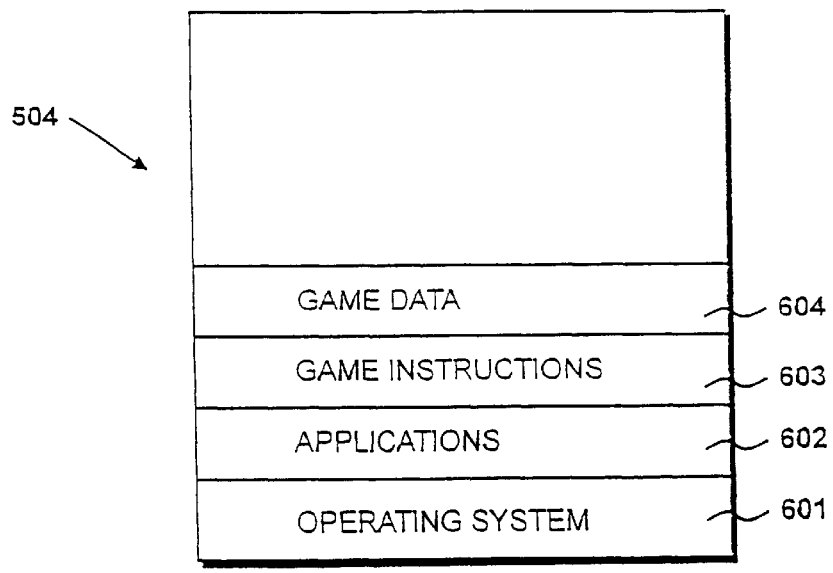
FIG. 6 details contents of the memory shown in FIG. 5, including game data.

The contents of the memory 504 of the user's personal computer 101 shown in FIG. 5 are summarised in FIG. 6. An operating system, including a basic BIOS is shown at 601. This provides common functionality shared between all applications operating on the computer 101, such as disk drive access, file handling and window-based graphical user interfacing. Applications 602 include instructions for an Internet browser, a file browser and other items, that are usually present but inactive on the user's graphical desktop. Game instructions 603 comprise the program steps required by the CPU 501 to act upon game data 604. These provide game functionality. The game instructions 603 are static and do not change. The game data 604 includes dynamic changeable elements.

Figure 7:
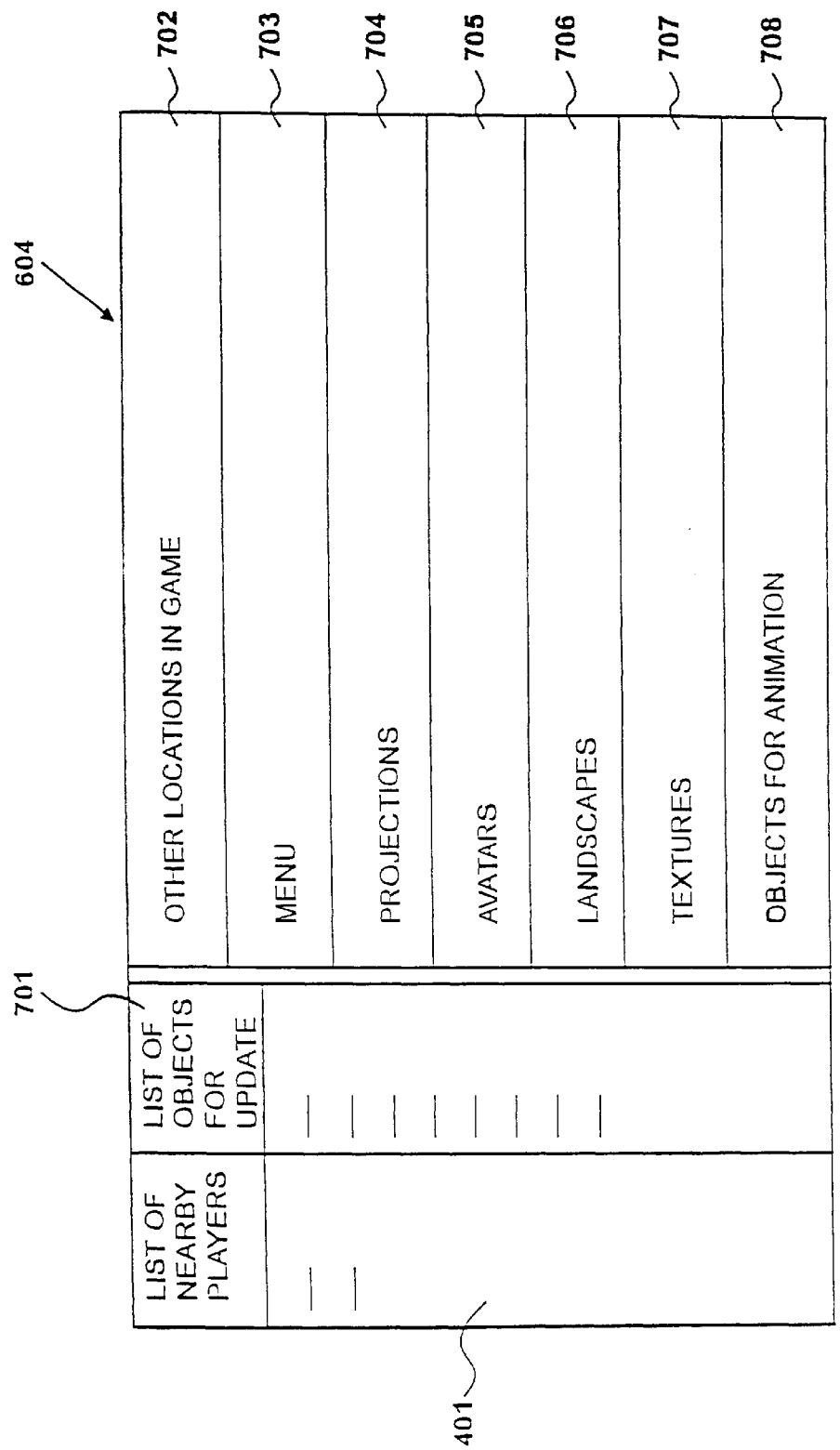
FIG. 7 details the game data shown in FIG. 6, including a list of nearby players, a list of objects for update, avatars and objects for animation.

The game data 604 shown in the computer's memory in FIG. 6 is detailed in FIG. 7. The list of nearby players 401, shown in FIG. 4, is part of the game data 604. The list 401 changes during play. The user's avatar has a position that occupies between one and four of the overlapping cells. The list of nearby players contains a representation of each of those players that is in a cell also occupied by the user. However, list maintenance may be minimised by not removing players unless they are very distant. Players are always added as soon as they share the same cell as the user. The list of nearby players includes indications as to which of the players in the list is nearby or distant.

Also included in the game data is a list of objects for update 701. This comprises all those objects that in some way contribute to the environment of the cells in which the user's avatar is located. The environment may be considered as being updated a frame at a time, and preferably the frame rate is as high as possible in order to provide the illusion of smooth action. Typical frame rates are kept low by the complexity and number of objects in the list of objects for update 701, and the usual rate is between one and ten frames per second. Object movement between frames may be interpolated in order to increase the frame rate with a minimal increase in processing cost.

Other locations 702, are data items that contain co-ordinates for other locations in the game, to which the user may jump if required. In this way, it is possible for a user to jump from region to region in order to discover an interesting part of the game. Menus 703 are menu items that overlay the game during play, for the user to identify various options. Projections are different ways of viewing the game. Typically the game is viewed as a three-dimensional projection, providing as high a degree of realism as possible. An accompanying map, similar to FIG. 3, is usually displayed on the user's monitor, in order to illustrate from an aerial view where in the game the user's avatar is located. The user may be provided with a hot key, such as key F1, to switch quickly between two commonly used views.

Avatars 705 are the designs for the appearance of the user and other players in the three-dimensional projection of the game. The user plays against opponents who appear in the form of their chosen avatars. Avatar data is transmitted from the other players' during an initialisation process. The user's own avatar data is also transmitted at this time, so that the other players' computers can provide a convenient projection of the user's actions.

Landscapes 706 and textures 707 from large data volumes that define the scenery and architecture that make up the virtual landscape of the game. These landscapes and textures are required for the cells in which the user is located. In games comprising very detailed landscapes and highly realistic surface textures, data 706 and 707 may be supplied on a CD-ROM, so that problems of transmission over the Internet are minimised. A CD-ROM of this type would also be used for loading program instructions into a user's computer. Alternatively, the program instructions could be provided over the Internet.

Objects for animation 708 include missiles, moving pieces of architecture such as doors, clouds, mist, explosions and so on. These are occasionally referenced in the list of objects for update 701, so that as each frame is created, all the dynamic objects and items contained in the cells that the user occupies are updated. This update process includes calculation steps that identify interactions between objects. For example, if the user attempts to shoot an opponent's avatar, a missile may be launched that takes several frames to traverse its trajectory. During this time, the missile may encounter the opponent's avatar, hit a piece of architecture, or continue off into space. At each frame, interactions between the missile and all the other objects on the list of objects for update must be calculated. The list of objects for update 701 forms the basic data structure for developing these comparisons. Furthermore, as the user moves about, and events occur, such as the explosion or removal of an opponent's avatar, the list of objects for update changes. Attributes for each of these objects are referenced in the list 702 are also updated, and on a frame-by-frame basis.

The list of nearby players 401 shown in FIG. 7 is detailed in FIG. 8. The first player in this list is player 102. The first list item has a first field that contains the identification string 801 for player 102. The next field 802 contains the IP address for player 102. A position field 803 provides x and y co-ordinates for the location of player 102's avatar. Field 804 provides a pointer to player 102's avatar, such that a detailed description of the avatar may be accessed via the address to which the pointer 804 is directed. A validity field 805 indicates whether or not player 102 is in a cell that is shared by the user, and this may be considered as defining whether player 102 is nearby or distant. The second list entry for a nearby player 103 is also detailed in FIG. 8. A third list entry is shown for a player that is no longer sharing a cell with the user. This condition is indicated in the final field 806, having the condition of "distant". During list maintenance this player will be removed from the list of nearby players 401, when it becomes more than one cell distant.

The avatar referenced by field 804 in FIG. 8 has a data structure that is shown in FIG. 9. An identification string 901 identifies the avatar uniquely as belonging to player 102. The second field 902 provides an indication of the number of lives the avatar has left. In many such games, an avatar may be "killed" several times, a counter is decremented each time the avatar is killed, and if this is decremented to zero, the player is removed from the game. In co-operative games, various bonus schemes enable the player to increment the life counter 902, so that the player's duration in the game is related to their skill at performing several tasks.

A position field 903 provides access to the same position data 803 shown in FIG. 8. A trajectory field 904 provides a description of the velocity of movement of the avatar in each of the x and y dimensions. A first derivative field 905 provides first derivatives of velocity with respect to time, in each of the x and y dimensions. A "look" pointer 906 provides access to data that describes how the avatar is to appear in the environment, and a "guns" pointer 907 provides access to data describing appearance, operation and status of armaments which the avatar may use during simulated combat. In co-operative games, other types of attributes are stored.

An example of one of the objects for animation 708 is a missile launched by player 102, and a data structure for this missile is shown in FIG. 10. A missile ID field 1001 uniquely identifies the missile. A position field 1002 identifies the current location of the missile, and a trajectory field 1003 indicates its present velocity in each of the x and y dimensions. A "look" field 1004 provides access to data describing how the missile looks in flight, and how it appears during explosion.

Figure 11:
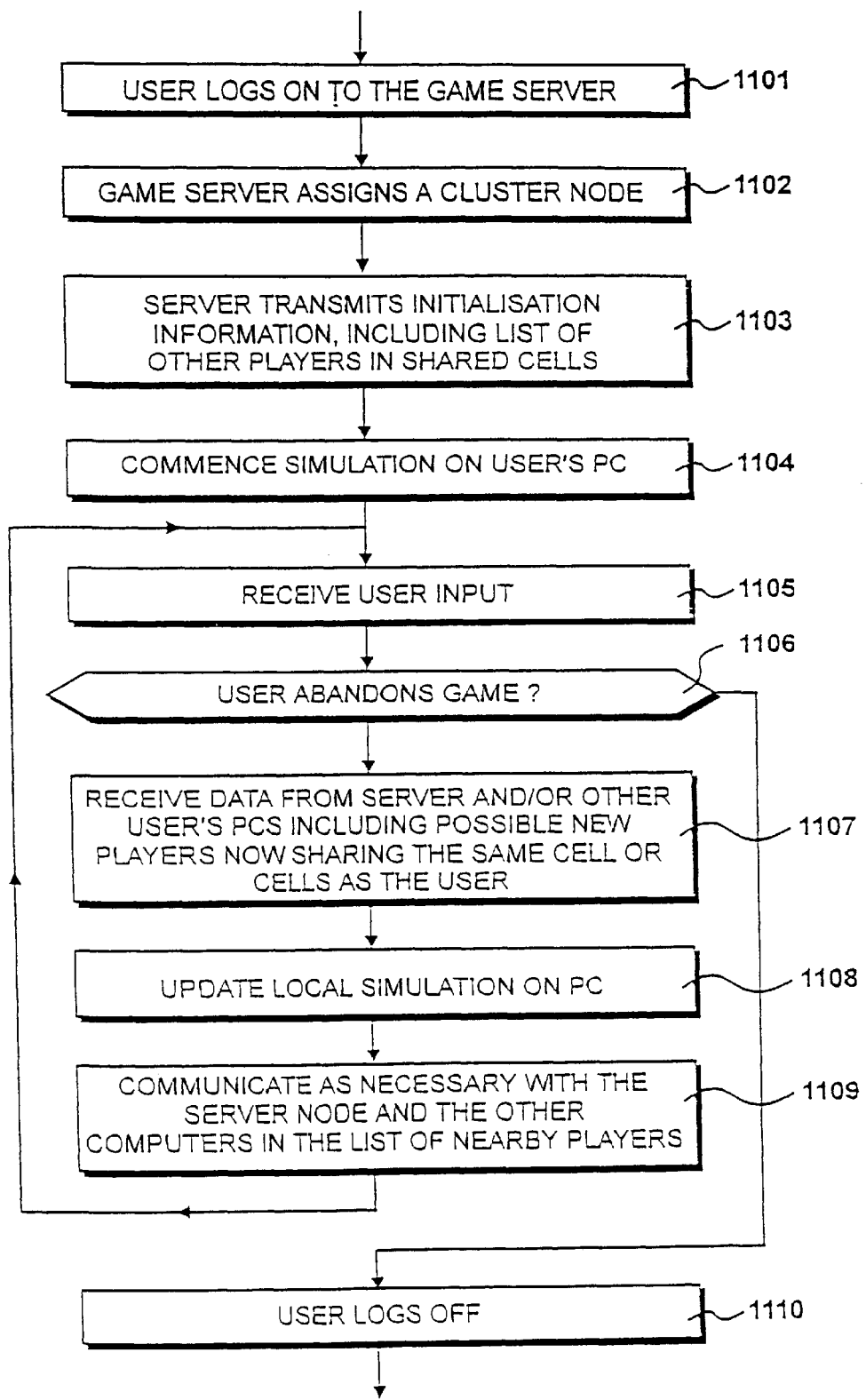
FIG. 11 summarises actions performed at a user terminal when logging.

A user sessions such as that occurring at terminal 101 is summarized in FIG. 11. At step 1101 the user logs on to the game server 162. This involves starting the game instructions 603 on the user's personal computer 101. The game instructions 603 include instructions for cooperating with the operating system 601, to initiate communication over the Internet with the game server 161. The user provides identification to the game server, and the game server indicates whether the identification is valid. At step 1102 the game server 161 assigns a node 162 from its cluster of networked computers. The cluster node that is assigned is the one which is responsible for the region of the game the user has been designated as starting in.

At step 1103 the server node 162 transmits initialisation information, including the list of other users sharing the same cells as user 101. At step 1104 the simulation is started on the user's personal computer 101, and this involves initialising, and constructing where necessary, the game data shown in FIG. 7. At step 1105 a user input buffer is examined to determine user commands. The user input buffer is a first-in-first-out list of user actions, including mouse movements, keyboard actions and, if connected, joystick actions. Some user commands may be implemented as interrupt-driven events, which bypass the first-in-first-out structure. At step 1106 a question is asked as to whether the user has indicated a wish to abandon the game. If answered in the affirmative, control is directed to step 1110, and the user logs off from the game. Alternatively, if the user commands do not indicate and end to their participation, then control is directed to step 1107.

At step 1107 data is received for updating the game data on the user's computer 101. This may include data transmitted over the Internet from the game server, or, in a preferred embodiment, data transmitted directly from personal computers in the list of nearby players 401. The game server may supply the user's computer 101 with newly identified players for the list 401, as result of movements of the user's avatar, or movements of other players' avatars. At step 1108 the local simulation is updated on the user's computer 101. The local simulation is considered a simulation of the game environment, or virtual world. Of most importance is a question as to whether the cells visible to the user, which are those cells in which the user's avatar is located.

At step 1109 communications are performed, as and when these are necessary, with the server node 162 and other computers whose IP addresses are listed in the list of nearby players 101. Thereafter, control is directed back to step 1105. Steps 1105 to 1109 may be considered as representing the update of a single frame generated during the playing of the game. This sequence is repeated as frequently as possible, in order to create the illusion of smooth motion and interactions. It is not necessary for the frame rate to be constant, and the duration of step 1108 may vary, due to the widely varying requirements of rendering a complex three-dimensional representation of the environment.

Steps 1105 to 1109 are illustrated as occurring in a purely sequential fashion. However, in an optimised implementation, certain processes may be pipelined, such as graphical computations performed during step 1108, and certain processes may be implemented as threads. Translation of the sequence of steps shown in FIG. 11, and subsequent flow charts, into these forms, will be familiar to those skilled in the art. Multi-threaded, multi-processed and/or pipelined implementations of the present embodiment are all encompassed by the invention.

Figure 12:
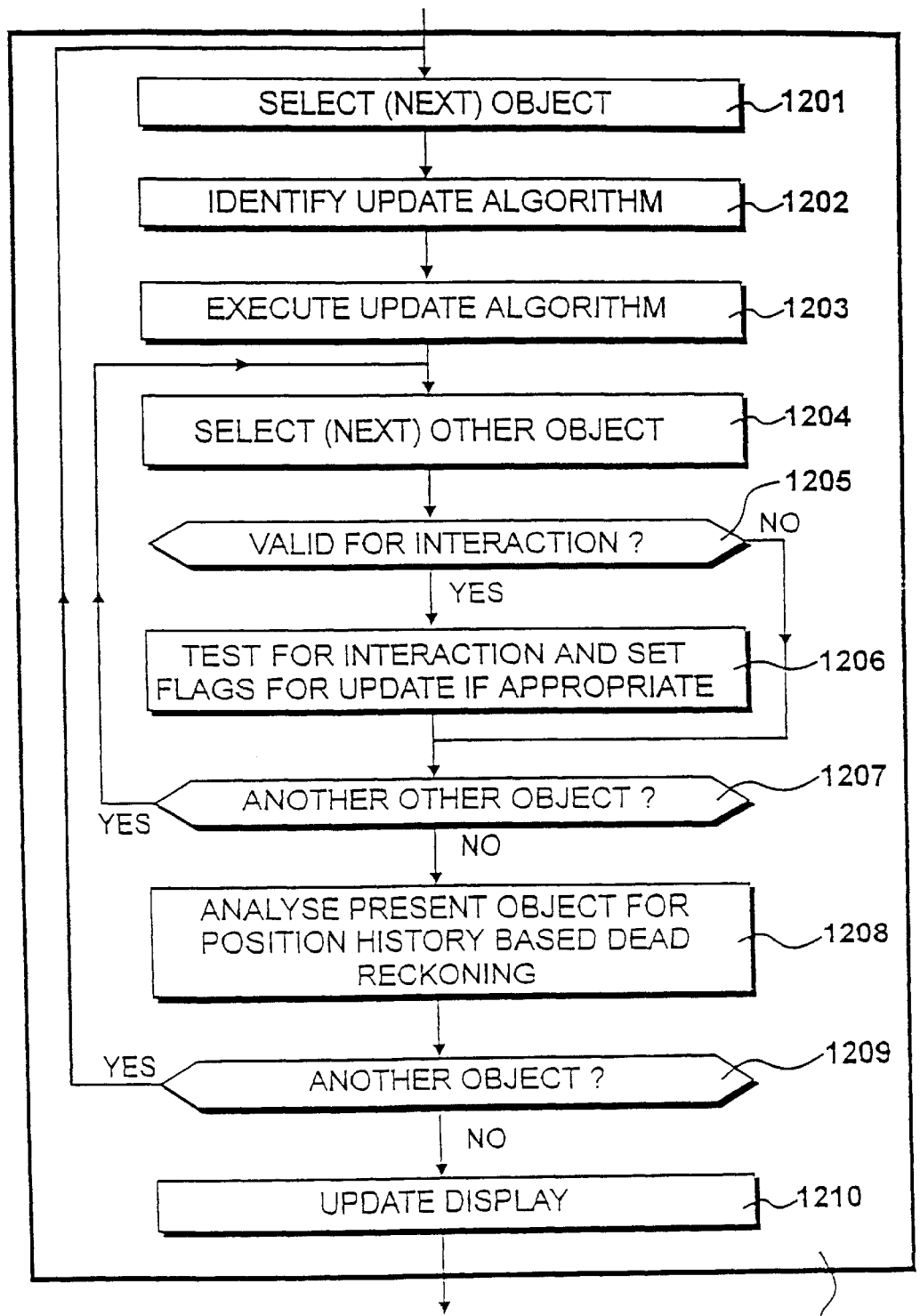
FIG. 12 details processes for updating a local simulation.

Processes for updating the local simulation of the user's PC, identified at step 1108 in FIG. 11, are detailed in FIG. 12. The steps are based around information contained with the list of objects for update 701 shown in FIG. 7. Initially, at step 1201, the first object, in the list of objects 701, is selected. At step 1202 an identification is made of the update algorithm which is to be used to update the object. In object orientated programming languages, a generic function call to update the object will automatically result in a selection of an appropriate function particular to the type of object that is to be updated. For example, updating the user's avatar requires a different set of update operations from the set of operations required to update a projection viewpoint. At step 1203 the algorithm for updating the object is performed.

The next sequence of steps, from 1204 to 1207, selects every other object in the list of objects for update 701, and compares it with the object selected at step 1201. This will eventually result in all objects in the list 701 being compared to each other, once all the steps in FIG. 12 have been completed. At step 1204 the first other object from the list 701 is selected. On the first occasion, this will be the second object in the list, since the first object was selected at step 1201. At step 1205 a question is asked as to whether the two objects are valid for interaction. For example, when considering whether or not a missile object is valid for interaction with an avatar, the result of this question will be "yes", and control is directed to step 1206. Alternatively, for example, if the two objects are a missile and a projection of the game area, then the answer to the question at step 1205 will b "no", and control is directed to step 1207.

At step 1206 a test is made for interaction. In the case of a missile and an avatar, the comparison can be made on the basis of intersecting polygons. If a polygon belonging to an avatar intersects a polygon belonging to a missile, then this will be considered a hit by the missile. It may be that a level of optimisation is performed, such that individual surface polygons of the objects do not need to be considered. Instead, their proximity based on notional object centres is used. This reduces the computational cost of calculating the interaction. If such an interaction does occur, a flag is set, so that on the next iteration of the update algorithm at step 1203, the object may destruct, or cause some other type of effect, as appropriate. At step 1207, a question is asked as to whether there are any other remaining objects in the list to be compared with the currently selected object. If so, control is directed to step 1204. Alternatively, control is directed to step 1208.

At step 1208 an analysis is made of the position of the present object for the purposes of position history-based dead reckoning (PHBDR). Not all objects require this technique to be used, and the analysis includes a filtering process to exclude application of this algorithm from objects that do not require it. At step 1209 a question is asked as to whether another object is to be selected from the list 701. On the first pass, many objects will remain, and control will be directed back to step 1201, where the second object will be selected. Subsequently, at step 1204, the first object to be checked with this interaction, will be the first object. An advanced form of this algorithm excludes repeated comparisons, by generating a list of permutations of test pairs in advance of these steps. This improved algorithm is not illustrated here for reasons of clarity, and those familiar with these techniques will have no difficulty implementing this basic optimisation method.

Finally, after all objects have been considered in pairs, the display is updated at step 1210. In practice, data describing the scene is supplied to a pipelined graphical thread, that interacts with the graphics card 507 in order to optimally utilise all available processing resources simultaneously.

The steps in FIG. 12 identify a difficulty with any gaming or simulation environment where objects interact in an unpredictable way. Comparisons must be performed between all objects within the environment in order to ensure that any chance interactions are taken into consideration, such as glancing blows of objects against surfaces. This is a fundamental constraint within any dynamic computer-generated environment. Optimisations are known that reduce the computations necessary for such comparisons to be made. For example, comparing notional centres between possibly colliding objects, instead of comparing collisions between constituent surface polygons. Also, generalisations can be made at a distance, and, if necessary, more detailed mathematics can be used when such general comparisons indicate that two objects are now interacting closely.

In many known multi-user game systems, the server 161 provides the computational resources to perform such comparisons, and it is considered reasonable to provide a high level of processing at this central location. However, no matter how simplified or general the tests carried out at step 1205 and 1206 are, when enough users share the same environment, the number of tests performed rises exponentially. This places a strict limit on the number of users who may share the same computer-generated environment, and in practice this number can be as few as eight players, even on advanced game equipment. Known methods of simulating shared virtual environments suffer from the basic problem that arises from the steps shown in FIG. 12. In particular, steps 1204 to 1206 result in a potentially enormous number of comparisons being required for substantially large numbers of sharing users.

Although a shared environment may have theoretically unlimited numbers of players, in the invention each user has a list of nearby users, whose location is such that they should be considered for interaction with the user's avatar, and other objects in the user's vicinity. Rather than requiring a comparison to be made, as at step 1205, between all users in the game as a whole, only those players that are nearby are considered. This information is provided by the list of nearby users 401, which requires maintenance only when players move across cell boundaries. Furthermore, the server need not be involved in the sending of information between users, and, in practice, the three users 101, 102 and 103, can carry on with the game irrespective of distant players.

The requirement for the server to simulate a complicated large virtual world, with many interacting users, in real time, is reduced. The server's essential role is to co-ordinate resources, and back-up data resulting from play between users. This back-up can be performed once every few seconds; less than the frame rate, thereby reducing the computational overhead at the server. This arrangement makes it possible for a server node to deal with regions that cover many cells, and deal with many hundreds or even thousands of users.

Figure 13:
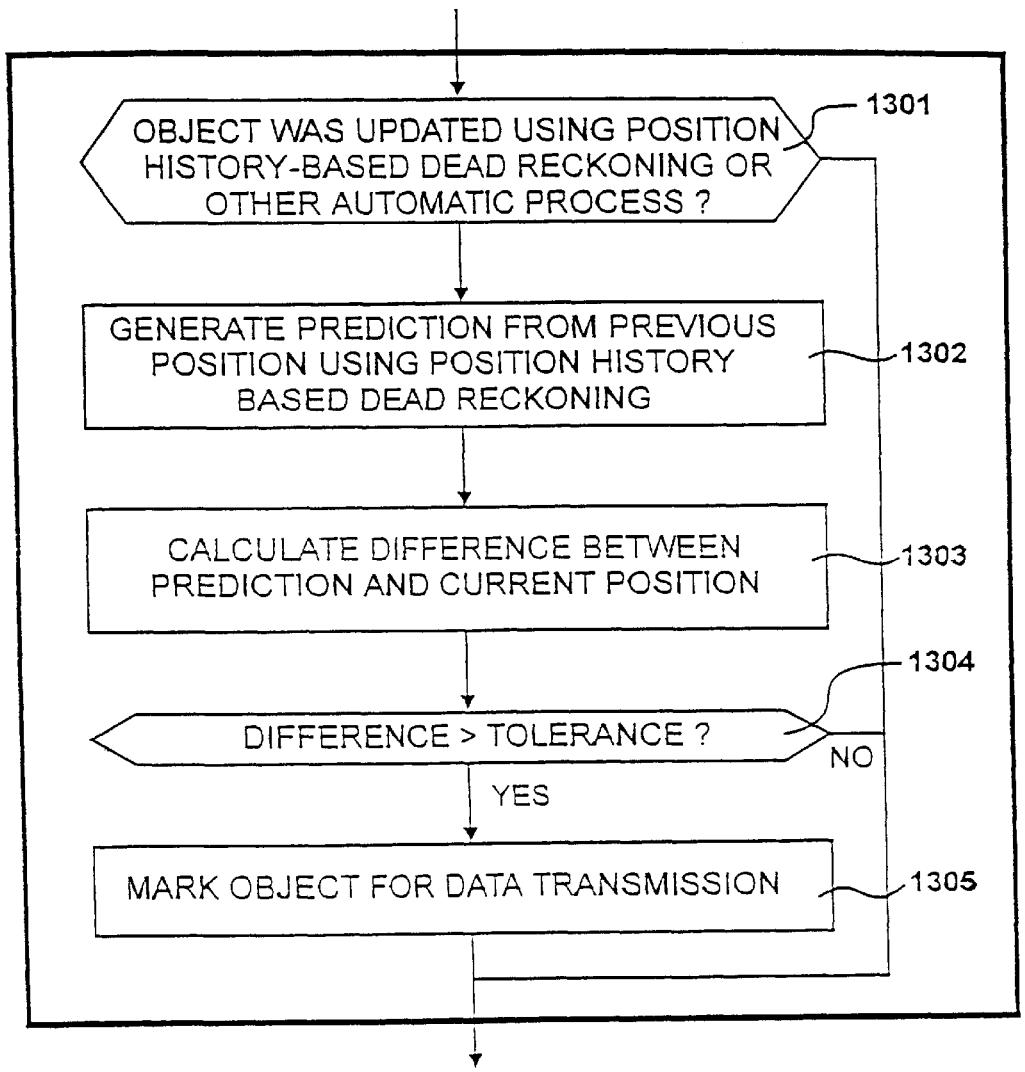
FIG. 13 shows a summary of position history-based dead reckoning.

A summary of the position history-based dead reckoning (PHBDR) process at step 1208 in FIG. 12 is shown in FIG. 13. At step 1301 a question is asked as to whether the object has been updated using PHBDR or other automatic process. If so, no PHBDR processing is required, and so control is directed to step 1209 in FIG. 12. An example of an object updated using PHBDR is another player's avatar. An example of an object not updated using PHBDR is the user's own avatar. So, for example, at step 1302 a prediction is made of the user's avatar's position based on previous positions, and using the method of PHBDR. At step 1303 a calculation is made between the avatar's actual current position, and the position predicted using PHBDR. At step 1304 a question is asked as to whether this difference between predicted and actual positions is greater than a pre-defined tolerance limit. If within tolerance, control is directed to step 1209 of FIG. 12. Alternatively, if there is a substantial difference between predicted and actual positions, at step 1305 the user's avatar, or other object, is marked for update.

Figure 14:
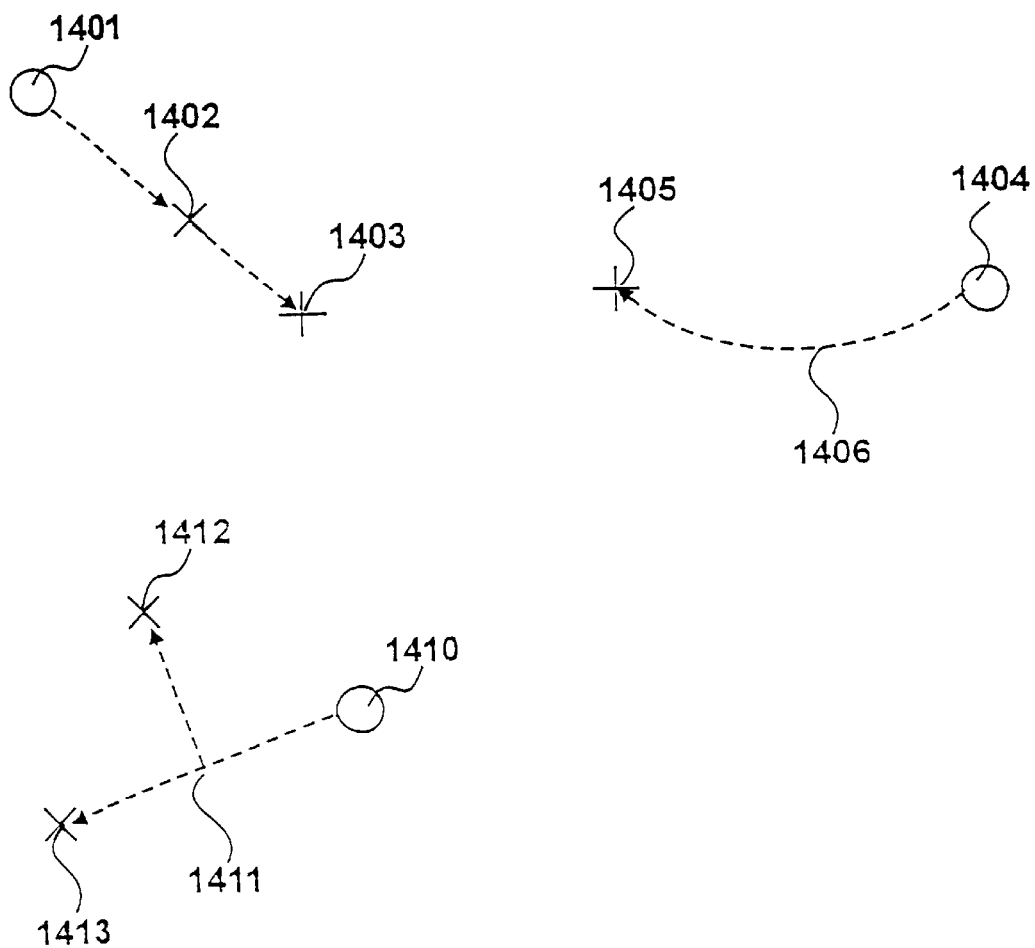
FIG. 14 shows a graphical representation of position history-based dead reckoning.

Position history-based dead reckoning is illustrated graphically in FIG. 14. A first object's previous position is shown at 1401, with its present position shown at 1402. The difference between the two is a straight line. Given the object's trajectory and previous position, its present position 1402 can be calculated automatically, without the need for explicit position data. Furthermore, its position after any time, t, can be determined using knowledge of its previous positions, provided it continues to travel in accordance with previously observed characteristics. Thus, its position in a subsequent frame can be determined as being at 1403, without the need for any explicit data concerning its position. If the object is another user's avatar, then predictable movement of this type can be used to reduce or avoid the need to transmit data over the Internet between users. Another user's avatar is shown at a first position 1404 and a second position 1405. Its trajectory 1406 is a first order curve. However, the curvature may be known if first derivatives of x and y co-ordinates, or some other suitable indicator are known, as indicated at 905 in FIG. 9. If this user's avatar continues along, or nearly along, this curve 1406, then there is no need for it to transmit its position data to computers upon which it is visible.

A third user's avatar begins at position 1410 having a linear momentum sending it in a straight line. However, its user has to negotiate an obstacle, and so diverts its trajectory at point 1411, resulting in a real position 1412 that is different from its predicted position 1413. Under these circumstances it is necessary for the avatar's position and new trajectory to be transmitted explicitly to the co-operating computer terminals, as it is clearly impossible for the other computers to predict its actual location. Step 1304 in FIG. 13 may be considered as the comparison between real 1412 and predicted 1413 positions. Small deviations may be tolerable, but a level will be reached after which positions must be explicitly updated. Each of the three computers 101, 102 and 103 performs this type of analysis upon its own avatar's position, and performs the extrapolation process upon the other's avatars. In this way, communication only occurs between the computers when behaviour is unpredictable, and so the same near-identical shared environment is synchronised on these three computers, even at times when there is no communication between them.

Figure 15:
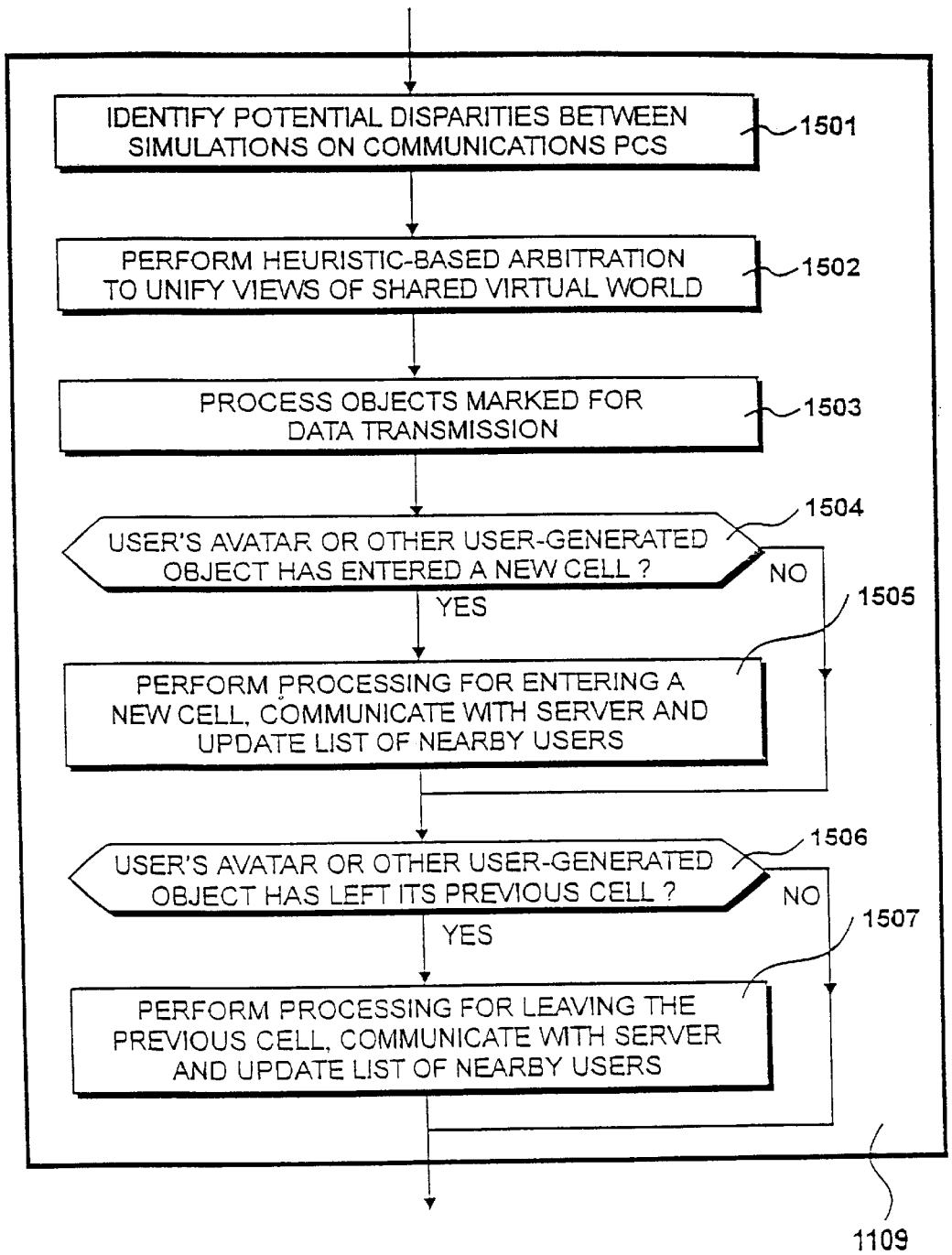
FIG. 15 details the step of communicating with nearby players and the game server shown in FIG. 11, including a step of processing objects marked for data transmission, a step of processing performed when the user has entered a new cell and a step of processing performed when a user leaves a previously occupied cell.

The process of communicating as necessary, identified at step 1109 in FIG. 11, is detailed in FIG. 15. At step 1501 disparities between simulations are identified. An example of a disparity of this kind is where an avatar on one simulation has been shot, whereas on another simulation the missile has missed, due to slight differences in time of received information arising from the nature of communication over a network such as the Internet. At step 1502 heuristic-based arbitration is used to unify views of the shared virtual world. Processes performed at step 1502 endeavour to achieve a consensus between disagreeing versions of the simulation on different computers, prior to any effect such as an explosion appearing on any user's terminal. At step 1503, the objects marked for data transmission at step 1305 in FIG. 13 are processed.

At step 1504 a question is asked as to whether the user's avatar, or other user-generated object, has entered a new cell. If not, control is directed to step 1506. Alternatively, control is directed to step 1505. At step 1505 communications are performed in response to new conditions being identified within the new cell, including possible identification of new players' avatars, and their addition to the list of nearby players 401.

At step 1506 a question is asked as to whether the user's avatar, or other user-generated object, has left a previously occupied cell. If not, control is directed to step 1110 in FIG. 11. Alternatively, control is directed to step 1507. At step 1507 communications are performed in response to new conditions being identified within the new cell, including possible removal of players' avatars from the list of nearby players 401.

From examination of the cell overlap scheme shown in FIG. 4 and steps 1504 to 1507, it will be seen that a level of hysteresis is provided. If a user's avatar hovers over a cell boundary, moving back and forth across it from frame to frame, it will only be necessary to obtain information about a new cell once. Thereafter, it is possible merely to flag other players' entries in the list 401 as being nearby or distant, and this flagging operation does not require any communication across the Internet. Players that are distant, and yet still retained in the list 401, can still transmit and receive data relating to position updates, by t the players avatars that are considered at steps 126 and 127 in FIG. 12 are only those that are flagged as being nearby.

Figure 16:
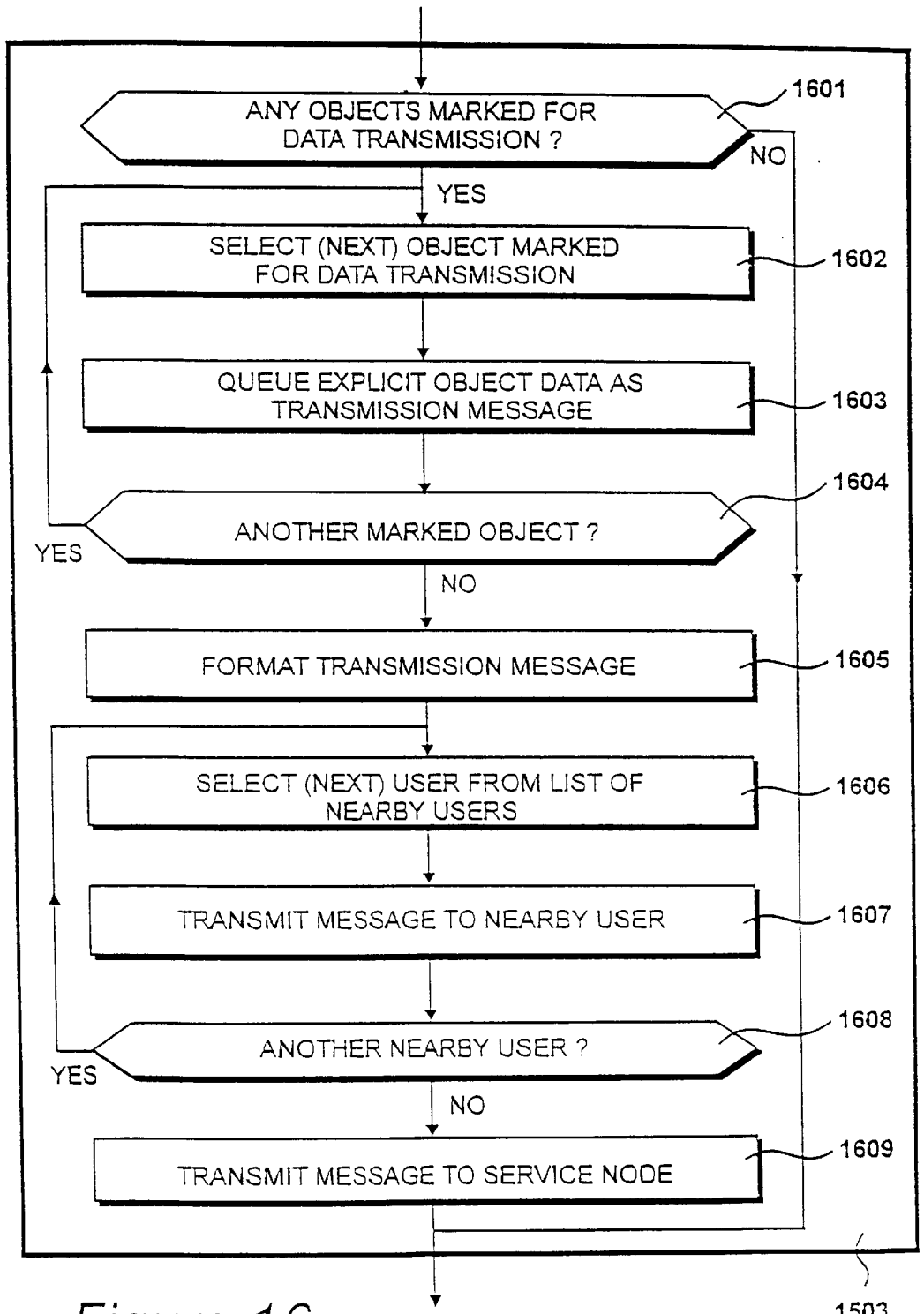
FIG. 16 details the step of processing objects marked for data transmission shown in FIG. 15.

The steps for processing objects marked for data transmission shown at step 1503 in FIG. 15 are shown in FIG. 16. At step 1601 a question is asked as to whether any objects have been marked for data transmission. If not, control is directed to step 1504 in FIG. 15. Alternatively, control is directed to step 1602. At step 1602 a first object is selected from the objects that have been marked for data transmission. At step 1603 explicit object data, such as position and trajectory, are queued as a transmission message. At step 1604 a question is asked as to whether there are any other objects marked for transmission that require processing. If so, control is directed to step 1602. Alternatively, control is directed to step 1605.

At step 1605 the transmission message is formatted prior to transmission. At step 1606 the first of the nearby users in the list of nearby users 401 is selected. At step 1607 the message formatted at step 1605 is transmitted to the first nearby user. At step 1608 a question is asked as to whether there are any other nearby users. If so, control is directed back to step 1606, and at step 1607 the same message is transmitted to the next user, and so on. This continues until all nearby users have been sent the message. Thereafter, at step 1609, the same message is finally transmitted to the server node 162, so that the server can update its own copy of this area of the game. Thereafter, control is directed to step 1504 in FIG. 15.

Figure 17:
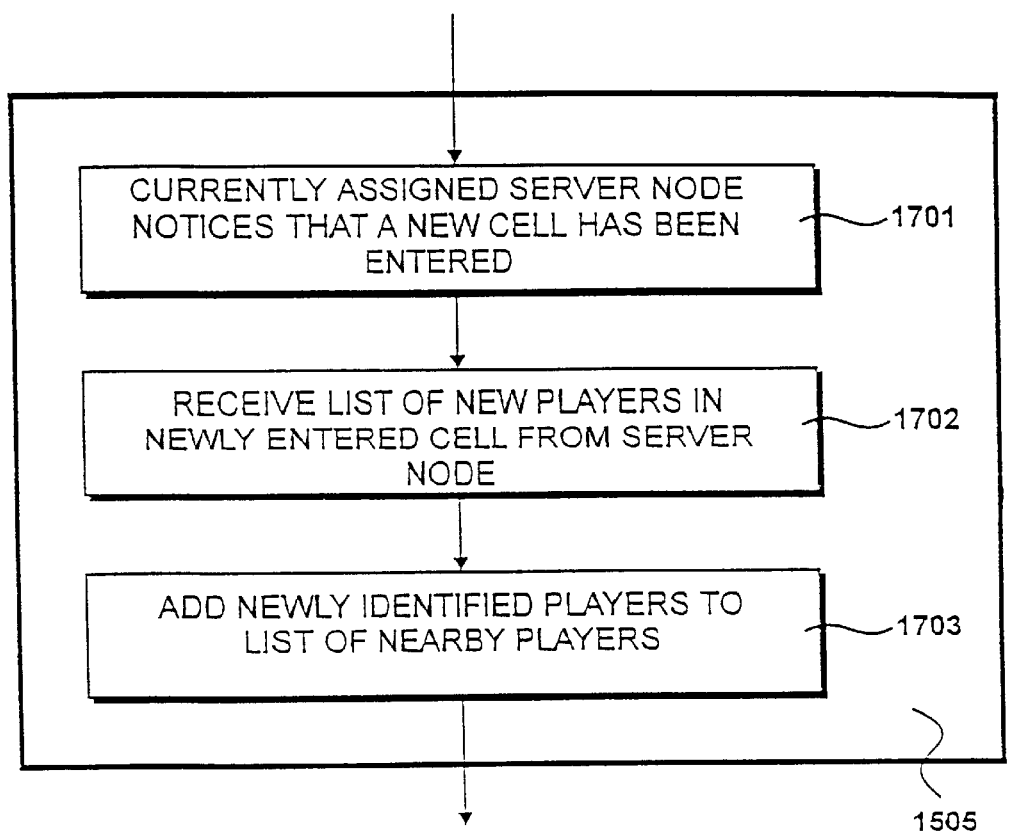
FIG. 17 details the step of processing performed when a user enters a new cell, shown in FIG. 15.

Processing that occurs when the user's avatar enters a new cell, indicated at step 1505 in FIG. 15, is detailed in FIG. 17. At step 1701 the currently assigned server node 162 notices that the user's avatar has entered a new cell. This fact is determined either automatically, by position history-based dead reckoning performed at the server node 162, or as a result of receiving a message transmitted at step 1609 in FIG. 1. The server node 162 tracks user movements just as if it was another player in the game.

At step 1702 the node 162 transmits a list of new players in the newly entered cell. It is possible that the user already has visited this cell, and is already aware of some of the players in it. The node 162 only transmits details players that have entered since the user was last in that cell, thereby keeping data transmission to a minimum. The server node 162 duplicates the user lists of nearby players 401, 402 and 403, and so is able to determine what transmissions are necessary, and when. The server node 162 also transmits the user's avatar's location to those other players that are affected. At step 1703 the newly identified players are added to the list of nearby players on the user's computer.

Figure 18:
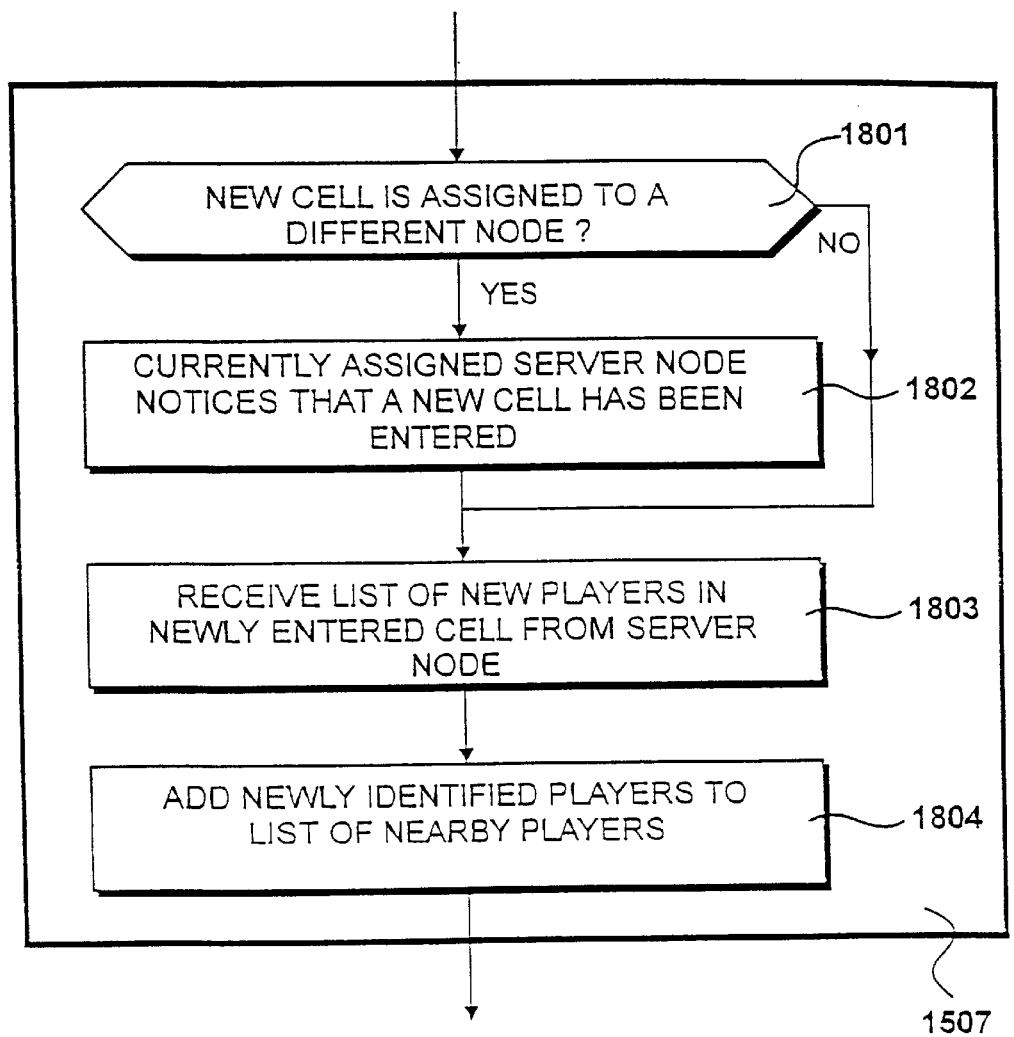
FIG. 18 details the step of processing performed when a user leaves a previously occupied cell, shown in FIG. 15.

Processes performed when the user's avatar leaves a previously occupied cell, identified at step 1507 in FIG. 15, are detailed in FIG. 18. At step 1801 a question is asked as to whether the new cell that has already been entered is assigned to a different server node. If not, control is directed to step 1803. Alternatively, control is directed to step 1802, where the responsibility for the user is transferred to the new node, and the user's computer 101 is notified of the IP address of the new node 163. At step 1803 the list of nearby players 401 is updated by flagging a player as being distant, as indicated by the example at 806 in FIG. 8. At step 1804 maintenance of the list 401 is performed. This includes removal of players that are very distant.

Figure 19:
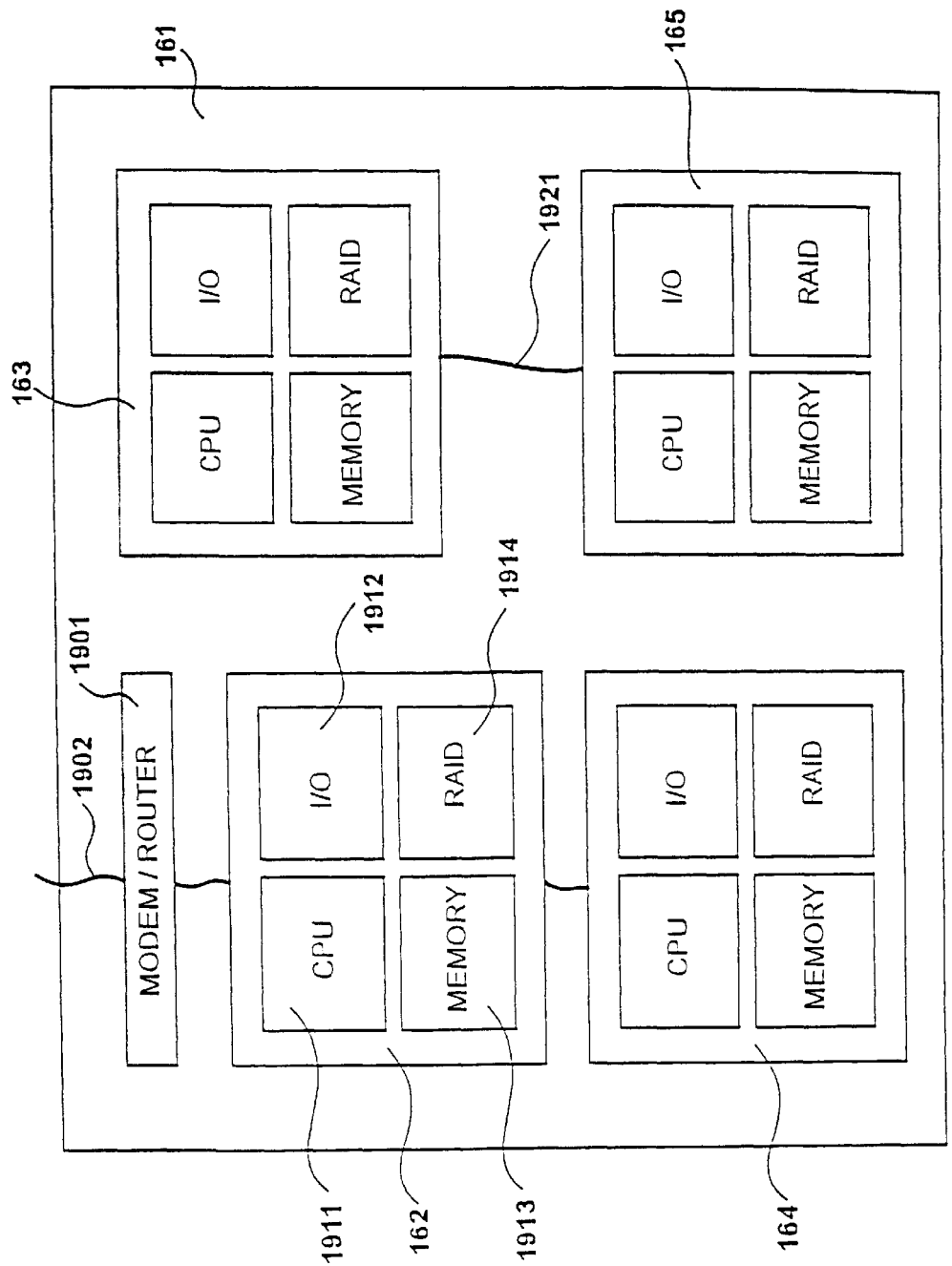
FIG. 19 details the first game server shown in FIG. 1, including four processor nodes, each having a memory.

The game server 161 shown in FIG. 1 is detailed in FIG. 19. The server 161 comprises a cluster of four computers 162, 163, 164 and 165, each considered as a node in the cluster. A modem/router 1901 receives incoming communication requests from a high capacity data connection 1902 to the Internet. New communication requests are routed from the modem 1901 to a receiving computer for continued communication. Each of the computers 162 to 165 includes a central processing unit 1911, input/output circuitry 1912, a memory 1913 and RAID disk storage 1914. The computers 162 to 165 and the modem 1901 are connected to a network 1921 in order to facilitate communication and co-ordination of available computing resources.

Figure 20:
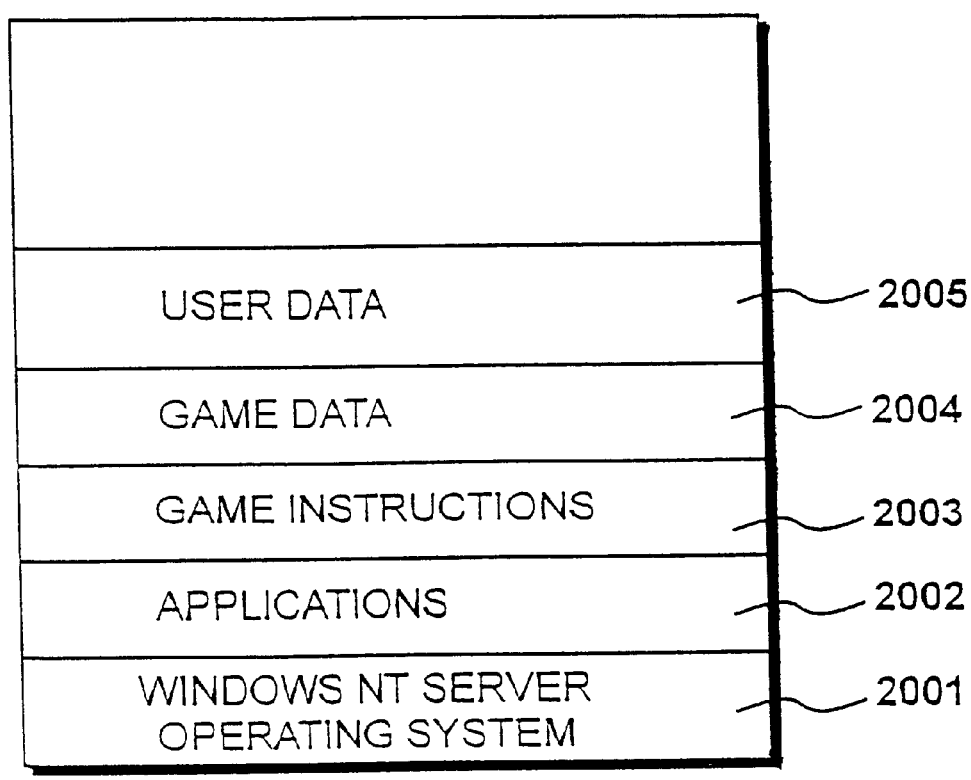
FIG. 20 summarises the contents of the memory of a first processor node of the type shown in FIG. 19.

The memory of a computer node 162 in the game server 161, shown in FIG. 19, is detailed in FIG. 20. A Windows NT Server 4.0™ operating system 2001 provides common system functionality for applications 2002 and game instructions 2003. Game data 2004 includes a description of the game region 302 for which the processing node 162 is responsible. Game data 2004 also includes information backed-up regularly from another node in the server cluster, such that, should another node develop a fault or crash, the game may proceed while the other computer is being repaired. User data 2005 includes information about the position of user's avatars and other dynamic user-generated objects in the game.

Figure 21:
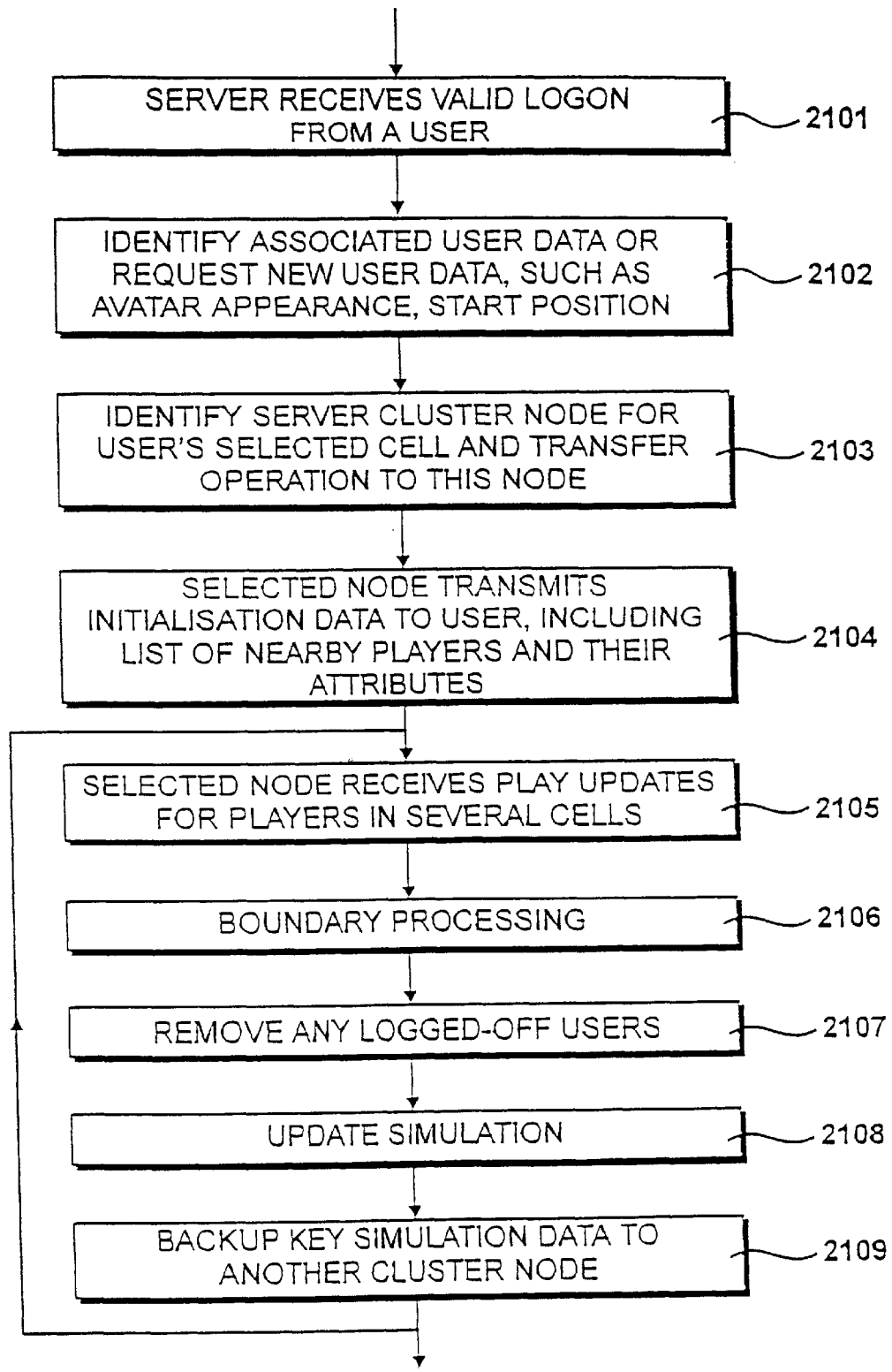
FIG. 21 summarises steps performed by the game server shown in FIG. 19, in response to a user request to join the game, including a step of boundary processing.

Processes performed by the game server 161 are summarised in FIG. 21. At step 2101 the server identified existing data associated with the user, or, if the user has not played before, requests information from the user, such as avatar appearance data, start position within the game and so on. At step 2103 a cluster node is identified in accordance with the user's requested start position within the game, and operations are then directed towards this node. In an alternative embodiment, the node for the user's region may be on a different server, which may be located anywhere in the world. At step 2104 the selected node transmits initialisation data to the user, including a list of nearby players 401 and their attributes.

At step 2105 the selected node receives play updates from players in the several cells that comprise the region 302 for which the node 162 has responsibility. At step 2106 boundary processing is performed. Boundary processing occurs for all users that have, or are predicted to have, crossed a cell boundary. At step 2107 any logged-off users are removed from the game. At step 2108 the simulation is updated. This includes verifying consistency of received data for all players in the game region 301. If there is any inconsistency, this may need to be arbitrated by the server node 162 between the players whose data is inconsistent. At step 2109 simulation data is backed-up to a neighbouring node so that the game may be recreated from this data in the event that the present node 162 develops a fault and the game has to be continued on a different node.

Figure 22:
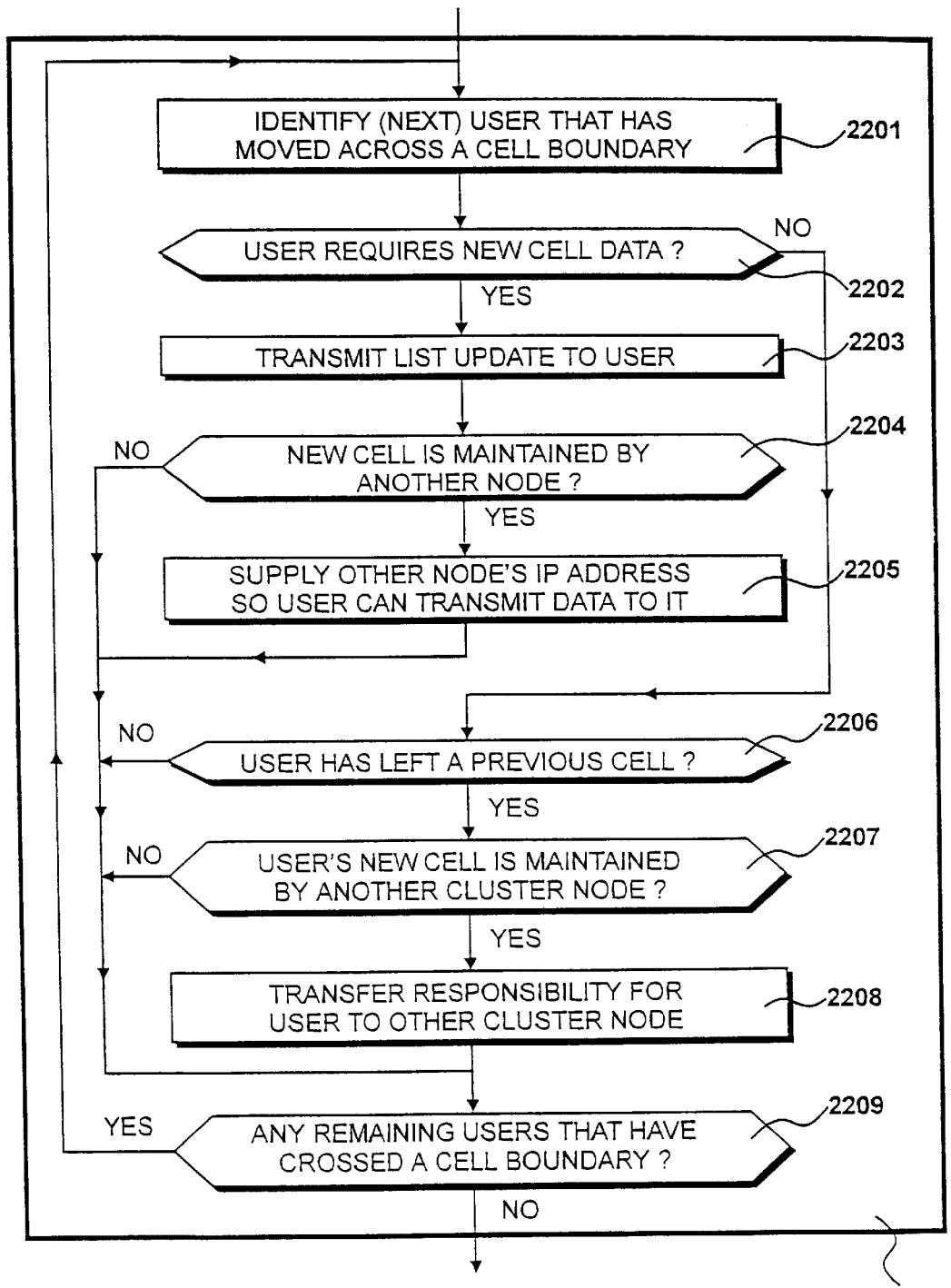
FIG. 22 details the step of boundary processing shown in FIG. 21.

The process of boundary processing indicated at step 2106 in FIG. 21 is detailed in FIG. 22. At step 2201 the first or next user that has crossed a cell boundary is selected. At step 2202 a question is asked as to whether the user that has crossed a cell boundary requires new data. This test is performed by comparing the node's copy of the users list of nearby players 401 with the actual players that should be in this list as a result of the user having crossed a cell boundary. If the user does not require new cell data, control is directed to step 2206. Alternatively, control is directed to step 2203, where additional data that the user requires is transmitted to the user, so that the list 401 on the user's computer 101 is correct. At step 2204 a question is asked as to whether the newly entered cell is maintained by another processor node. If not, control is directed to step 2209. Alternatively, control is directed to step 2205, at which the other node's IP address is supplied to the user's PC so that the user can transmit data to the other node, as well as to the node it is currently in communication with. Thereafter control is directed to step 2209.

At step 2206 a question is asked as to whether the user has left a previously occupied cell. If not, control is directed to step 2209. Alternatively, control is directed to step 2207, where a question is asked as to whether the user's new cell is maintained by a different cluster node. If not, control is directed to step 2209. Alternatively, control is directed to step 2208, where responsibility for the user is transferred to the new cluster node. At step 2209 a question is asked as to whether there are any remaining users that have crossed a cell boundary. If there are, control is directed to step 2201. Alternatively, all users that have crossed a cell boundary have been considered, marking the conclusion of boundary processing.

Figure 23:
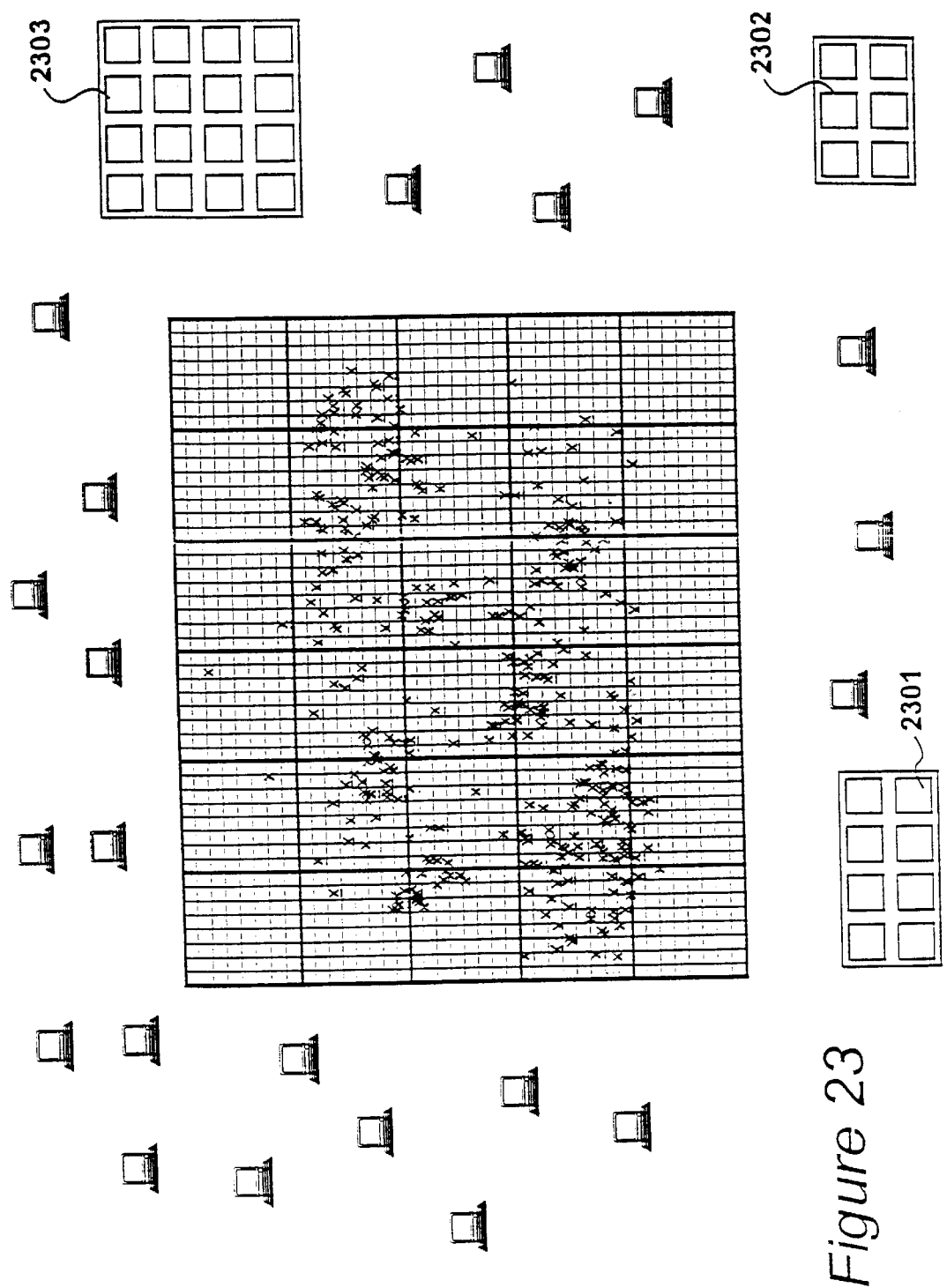
FIG. 23 illustrates the effect of enlarging the area of the simulated environment of the game by adding additional game server capacity.

The methods disclosed herein also facilitate an arbitrary extension of the area of the virtual world in which the game is played. Server clusters may be situated in any geographical location, and extremely large virtual worlds may be generated by the addition of additional server nodes. An example of a much larger game area is shown in FIG. 23. However, it should be clarified that the number of users supported by such an arrangement may be in the order of many thousands, and perhaps hundreds of thousands. A restriction exists on the number of players in the same cell, and cell sizes cannot be reduced without increasing the processing overhead that occurs when a player moves across a cell boundary. Hence, the main limitation of the invention is the umber of users per unit area in the virtual world, rather than the total number of users on the game as a whole.

The cells illustrated in FIG. 23 are grouped into equally sized regions, each one of which is the responsibility of a single computing node at one of the three game servers 2301, 2302 and 2303. The processing that is required to be performed by each node is affected by the number of players in its region. Clearly there are some regions containing fewer players than others. Regions with an extremely high concentration of players may force the speed of play to be reduced, in order that the server can perform essential processing. In order to overcome this difficulty, a node balancing procedure may be performed while the game is being played, such that the region areas are adjusted to equalise the load placed on each server required for the game. This has the result that fewer server nodes are required for the game as a whole, while providing the same level of game activity.

Figure 24:
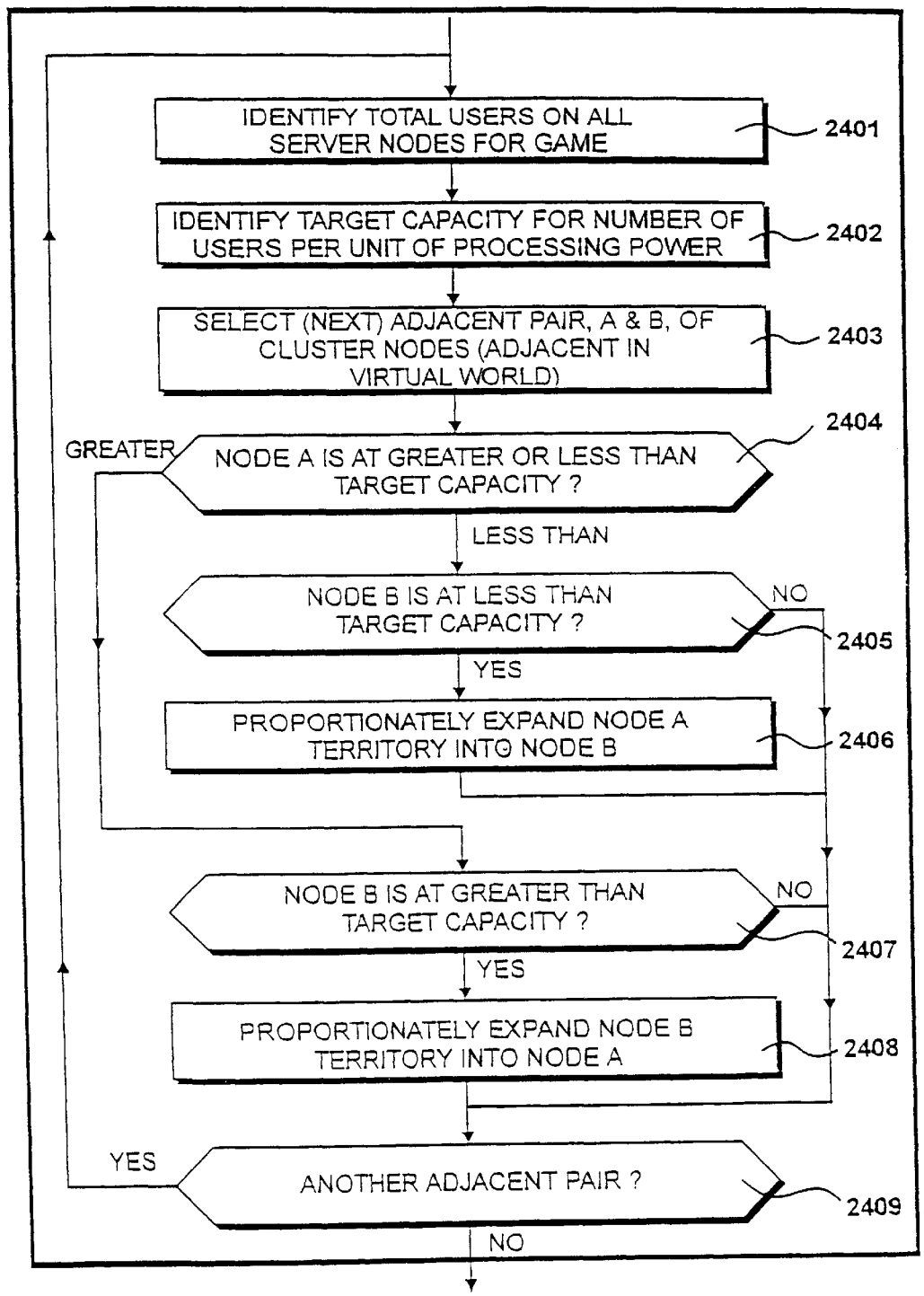
FIG. 24 summarises steps for balancing game processing across co-operating processing nodes, for the game shown in FIG. 23.

Steps for balancing the game are shown in FIG. 24. At step 2401 the total number of users playing the game is identified. This requires combination of data from all the game server sites. At step 2402 a target capacity is identified for the number of users per unit processing power. This is calculated by dividing the total number of users, calculated at step 2401, by the total processing capacity, expressed in arbitrary units. At step 2403 an adjacent pair of regions is selected for comparison, in association with their respective cluster nodes. Adjacency is considered in the vertical dimension, followed by the horizontal dimension. Each pair of nodes is considered as node A and node B.

At step 2404 a question is asked as to whether node A is at or less than the target capacity calculated at step 2402. If greater than target capacity, control is directed to step 2407. Alternatively, control is directed to step 2405. At step 2405 a question is asked as to whether node B is at less than target capacity. If not, control is directed to step 2409, and another adjacent pair is considered. Alternatively, control is directed to step 2406, where node A has its territory proportionately expanded into the territory of node B. Thereafter, control is directed to step 2409.

Figure 25:
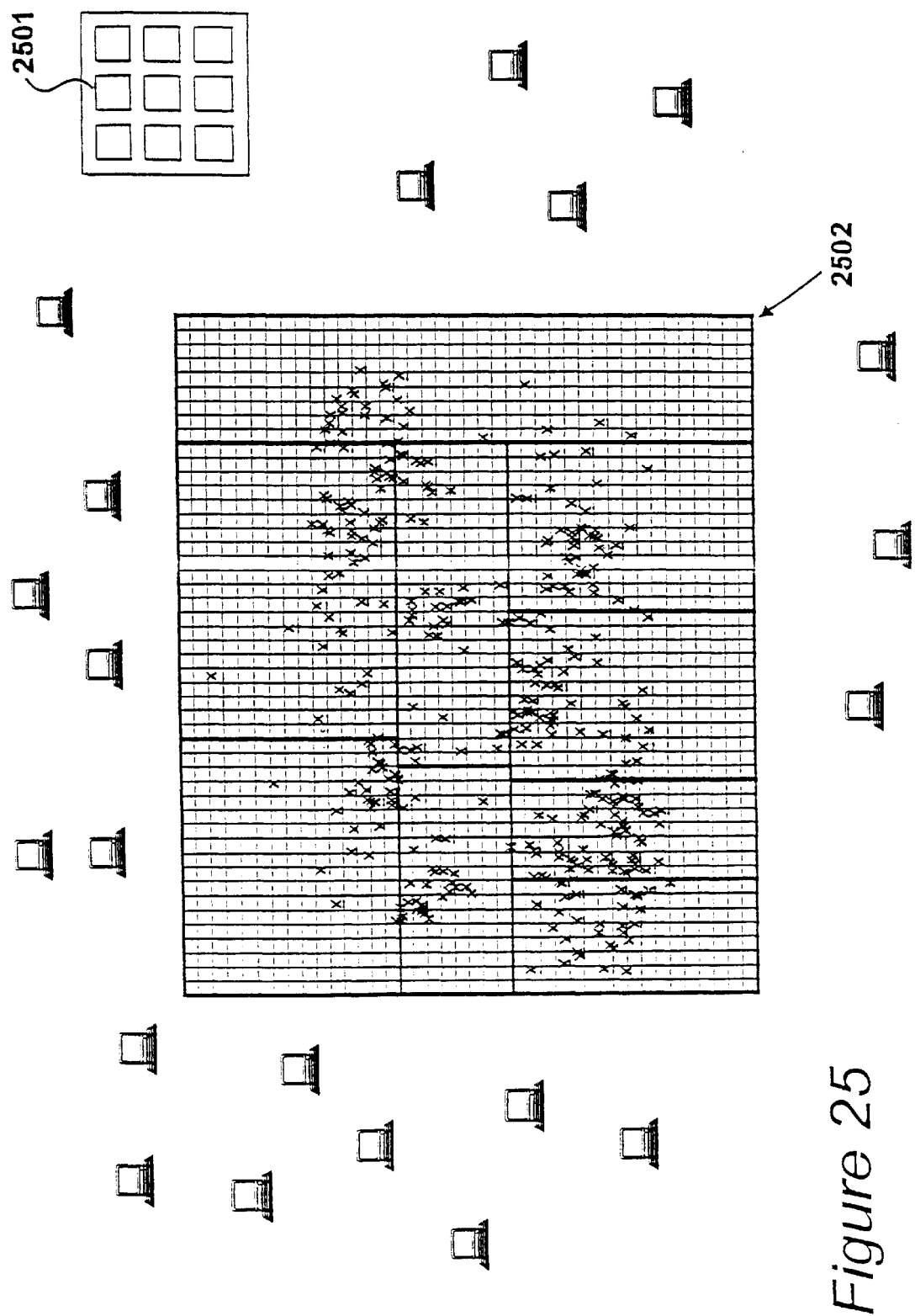
FIG. 25 illustrates the result of performing the balancing processing shown in FIG. 24.

At step 2407 a question is asked as to whether node B is at greater than target capacity. If not, control is directed to step 2409. Alternatively, control is directed to step 2408, where node B has its territory proportionately expanded into the territory of node A. Thereafter, at step 2409, a question is asked as to whether another adjacent pair is to be considered. If all horizontal and vertical pairs have been considered, then this marks the end of the balancing process. These steps may be repeated several times, iteratively, in order to achieve an improved balance. At each of steps 2406 and 2408 it is likely that the relative adjustment of sizes of nodes A and B will result in some alteration in size of other nodes, and additional optimisation steps are performed to ensure that this does not adversely affect the balancing procedure. The result of these balancing steps is illustrated in FIG. 25, which shows a reduced capacity server 2501 handling all the regions of the simulation 2502.

What is claimed is:

1. A computer network configured to define and update a shared computer-generated environment, said network comprising:

a serving computer configured to divide a computer-generated environment into a plurality of cells; and a plurality of user-computer terminals having display means, storage means, processing means and network connection means, wherein a first user-computer-terminal is configured to define an entry in said computer-generated environment in one cell or in a plurality of adjoining cells;

said user-computer terminal network connection receives notification data about other users sharing cells occupied said first user;

said user-computer terminal storage means is configured to store a list of users that share or have shared cells occupied by said first user; and said user-computer terminal processing means is configured to generate a message for another user identified in said list and to generate a local representation of said environment in response to data received from other users and in response to other user movements.

2. A network according to claim 1, wherein said processing means is configured to predict movements by position history-based dead reckoning.

3. A network according to claim 1, wherein said message is generated in response to an unpredicted user movement.

4. A network according to claim 1, including a plurality of serving computers wherein each of said serving computer maintains a copy of the lists of nearby users for all users within a region, wherein said region encompasses a plurality of said cells.

5. A computer network according to claim 4, wherein said serving computer comprises a plurality of processing nodes, wherein each of said processing nodes is responsible for the maintenance of a region of said computer-generated environment, and each of said regions comprises a plurality of said cells.

6. A computer network according to claim 1, wherein said processing means is configured to generate an update request via said network connection and said serving computer is configured to transmit position data in response to receiving said request.

7. A computer network according to claim 6, wherein said serving computer is configured to transfer responsibility for a user from a first node to a second node when the user's previous region is no longer occupied by the user.

8. A network according to claim 6, wherein said processing means determines whether to issue an update request by comparing server-held copies of a user's list of nearby users and a list of other users that have previously entered a cell occupied by said user.

9. Apparatus according to claim 1, wherein said serving computer is configured to divide said computer-generated environment into a plurality of overlapping cells.

10. A computer network according to claim 1, including input means configured to supply movement data to said processing means to effect movement of an entry in said computer-generated environment.

11. A method of updating a computer-generated environment shared between users connected via computer terminals connected to a network, said computer-generated environment being divided into cells, wherein a user's computer terminal performs the method comprising:

receiving notification of other users sharing the same cell or cells;

updating a list of users that share or have shared the same cell;

generating a message for at least one user in said list;

updating an environment generated on the computer terminal in response to other user data; and updating said list in response to user movements.

12. A method according to claim 11, wherein said user movements are predicted by position history-based dead reckoning.

13. A method according to claim 11, wherein said message is generated in response to an unpredicted user movement.

14. A method according to claim 11, wherein a network server maintains a copy of the lists of nearby users for all users within a region, said region encompassing a plurality of said cells.

15. A method according to claim 14, wherein said network server comprises a plurality of processing nodes, each responsible for maintenance of a region of said computer-generated environment, each region comprising a plurality of said cells.

16. A method according to claim 14, wherein said server transmits position data in response to a need for user update.

17. A method according to claim 16, wherein said need for user update is determined by a comparison between server-held copies of a user's list of nearby users, and a list of other users that have just entered a cell occupied by the user.

18. A method according to claim 11, wherein said cells are overlapping.

19. A method according to claim 15, including transferring responsibility for a user when the user's previous region is no longer occupied by the user.

20. A method according to claim 11, wherein movement data is defined by manually operable devices.

21. A computer-readable medium having computer-readable instructions executable by a computer such that, when executing said instructions, a computer will perform the method comprising:

receiving notification of users sharing cells, wherein a network of computer have generated an environment divided into a plurality of cells;

updating a list of users that share or have shared the same cell;

generating a message for at least one user in said list;

updating an environment generated on the computer terminal in response to other user data; and updating said list in response to user movements.

22. A computer-readable medium having computer-readable instructions according to claim 21, such that when executing said instructions a computer will also perform the step of predicting user movements by position history-based dead reckoning.

23. A computer-readable medium having computer-readable instructions according to claim 21, such that when executing said instructions a computer will also perform the step of generating said message in response to an unpredicted user movement.

24. A computer-readable medium having computer-readable instructions according to claim 21, such that when executing said instructions a computer will also perform the step of responding to input data defining the position of a user within the computer-generated environment.

* * * * *